US007204754B2

(12) United States Patent
Gray et al.

(10) Patent No.: US 7,204,754 B2
(45) Date of Patent: Apr. 17, 2007

(54) GAMING DEVICE HAVING A MECHANICAL AWARD INDICATOR

(75) Inventors: James M. Gray, Reno, NV (US); Michael S. Hoy, Reno, NV (US); Daniel J. Waller, Reno, NV (US)

(73) Assignee: IGT, Reno, NV (US)

(*) Notice: Subject to any disclaimer, the term of this patent is extended or adjusted under 35 U.S.C. 154(b) by 700 days.

(21) Appl. No.: 10/256,618

(22) Filed: Sep. 27, 2002

(65) Prior Publication Data

US 2003/0078089 A1 Apr. 24, 2003

Related U.S. Application Data

(60) Provisional application No. 60/325,831, filed on Sep. 28, 2001.

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/16; 463/22

(58) Field of Classification Search ............ 463/16–22; 273/138.1, 139, 141 R, 141 A, 142 R, 142 B
See application file for complete search history.

(56) References Cited

U.S. PATENT DOCUMENTS 2,135,182 A * 11/1938 Joze ....................... 273/145 R
2,545,644 A 3/1951 Benton et al.
3,463,906 A * 8/1969 Chiang ....................... 235/436
4,410,178 A 10/1983 Partridge
5,344,144 A 9/1994 Canon
5,344,145 A * 9/1994 Chadwick et al. ............ 463/31
5,362,052 A 11/1994 Kubatsch
5,490,670 A 2/1996 Hobert
5,788,573 A 8/1998 Baerlocher et al.
5,885,157 A * 3/1999 Harada et al. ................ 463/22
5,938,196 A * 8/1999 Antoja .................. 273/143 C
5,947,820 A 9/1999 Morro et al.
5,964,463 A 10/1999 Moore, Jr.
6,003,867 A * 12/1999 Rodesch et al. ........ 273/143 R
6,120,377 A 9/2000 McGinnis, Sr. et al.
6,162,121 A 12/2000 Morro et al.

(Continued)

FOREIGN PATENT DOCUMENTS

GB 2 268 415 12/1994

OTHER PUBLICATIONS

1 DU Dice Mechanism written by Starpoint Electrics Ltd., published in Jul. 2000.*

(Continued)

*Primary Examiner*—Robert P. Olszewski
*Assistant Examiner*—Jasson Yoo
(74) *Attorney, Agent, or Firm*—Bell Boyd & Lloyd LLP

(57) ABSTRACT

The present invention relates to a gaming device which includes an award indicator which includes rotating objects. At least one award value and preferably other symbols are displayed on the faces of the objects. The gaming device provides players with certain award values displayed by the objects after the objects have stopped rotating. This type of gaming device provides players with increased entertainment and enjoyment when playing gaming devices.

49 Claims, 22 Drawing Sheets

U.S. PATENT DOCUMENTS

| | | | |
|---|---|---|---|
| 6,168,520 B1 | 1/2001 | Baerlocher et al. | |
| 6,173,955 B1 | 1/2001 | Perrie et al. | |
| 6,190,255 B1 | 2/2001 | Thomas et al. | |
| 6,203,429 B1 | 3/2001 | Demar et al. | |
| 6,213,876 B1 | 4/2001 | Moore, Jr. | |
| 6,270,411 B1 | 8/2001 | Gura et al. | |
| 6,305,686 B1 | 10/2001 | Perrie et al. | |
| 6,336,860 B1 | 1/2002 | Webb | |
| 6,394,900 B1 * | 5/2002 | McGlone et al. | 463/20 |
| 6,419,579 B1 | 7/2002 | Bennett | |
| 6,481,713 B2 | 11/2002 | Perrie et al. | |

OTHER PUBLICATIONS

1DU Dice Unit Advertisement written by starpoint.uk.com, printed on May 14, 2001.

1Du Dice Mechanism written by Starpoint Electrics Ltd., published in Jul. 2000.

4Du Dice Unit Advertisement written by starpoint.uk.com, printed on Sep. 3, 2002.

Bally Slot Machines Electro-Mechanicals 1964-1980, Revised 3rd Edition written by Marshall Fey.

Dice Games article describing Poker Dice, published prior to 2001.

Double Dice Advertisement written by JHV Gaming Products, undated and English explanation from errel.com, printed on Jan. 24, 2003.

Field Testing New Slots written by Melissa Cook, Strictly Slots, published in Jul. 2000.

Free! 7-Day Trial on Daval's Reel Dice Advertisement written by Gerber & Glass, published in 1936.

Game Devices Advertisement written by starpoint.uk.com, printed on Sep. 3, 2002.

How to Play—Roll & Win Instructions written by WMS Gaming, wmsgaming.com, printed on Aug. 29, 2001.

Levy Patent Abstract written by Derwent Publications Ltd., published in 1991.

Mikohn Solutions, World Gaming Congress 2000 Edition.

Money Grab Article written by Strictly Slots, published in Apr. 2001.

Money Grab Advertisement written by WMS Gaming, Inc., wmsgaming.com, printed on Jan. 30, 2003.

Monopoly Brochures and Articles, written by WMS Gaming, Inc., published 1998.

Monopoly Movers & Shakers article written by Strictly Slots, published Jul. 2000.

Monopoly Party Train Article written by Strictly Slots, published Feb. 2002.

New Kids Article written by Strictly Slots, published in Dec. 2000.

Roll & Win Advertisement written by WMS Gaming, wmsgaming.com, printed Jun. 8, 2001.

Slot Machines A Pictorial History of the First 100 years, 5th Edition, written by Marshall Fey.

Slot Machine Buyer's Handbook A Consumer's Guide to Slot Machines written by David L. Saul and Daniel R. Mead, published 1998.

Slot Machines On Parade written by Robert N. Geddes and illustrated by Daniel R. Mead, published 1980.

Starpoint 1DU Dice Unit Product Summary written by Starpoint Electrics Ltd., published in Dec. 1999.

Starpoint 4DU Game Device Product Summary written by Starpoint Electrics Ltd.

Stars, Bars and Bones Game, P&M Coinc, Inc. available 1997.

Take Your Pick Article, Stictly Slots, published Mar. 2001.

Yahtzee Bonus Advertisement, written by Mikohn Winning Solutions Worldwide, published 1999.

Yahtzee Video Game Advertisement, written by Mikohn Winning Solutions Worldwide, published 1999.

* cited by examiner

FIG.11

| | DIE 1 | DIE 2 | DIE 3 | DIE 4 | DIE 5 |
|---|---|---|---|---|---|
| FACE 1 | 80 | 45 | … | … | … |
| FACE 2 | 40 | 1 UP | … | … | … |
| FACE 3 | 100 | 60 | … | … | … |
| FACE 4 | 0 | T | … | … | … |
| FACE 5 | T | 300 | … | … | … |
| FACE 6 | 50 | 60 | … | … | … |

GAMING DEVICE HAVING A MECHANICAL AWARD INDICATOR

PRIORITY CLAIM

This application is a non-provisional application and claims the benefit of U.S. Provisional Patent Application Ser. No. 60/325,831 filed on Sep. 28, 2001.

This application relates to the following co-pending commonly owned applications: "GAMING DEVICE HAVING AN INCREMENTING AWARD GAME," Ser. No. 10/185,415; "GAMING DEVICE HAVING A MECHANICAL AWARD INDICATOR," Ser. No. 10/256,937; and "GAMING DEVICE HAVING A DIE OR DICE DIRECTLY ASSOCIATED WITH THE REELS IN THE PRIMARY GAME," Ser. No. 10/355,466.

BACKGROUND OF THE INVENTION

Contemporary gaming machines, such as slot machines, video poker machines, video blackjack machines and video keno machines, include primary games and often secondary or bonus games. In one known gaming device, when a player obtains a predetermined outcome in a primary game, the gaming device uses a relatively large mechanical spinning wheel to indicate or present a predetermined award to the player. The gaming device then provides the award to the player.

In other known gaming devices, the gaming device causes mechanical dice to rotate when a predetermined event occurs. When the dice stop rotating, the dice display a certain number of dots. Depending upon how many dots are displayed, the player may or may not win a predetermined award.

In one known gaming device having a die rotating device, the die rotating device does not accurately and reliably track the die position, especially after one complete rotation of the die. Specifically, such gaming device includes a commercially available component, known as 1DU DICE UNIT™, which is manufactured by Starpoint Electrics Ltd., Unit 1 King Georges Trading Estate Davis Road, Chessignton, Surrey, KT9 1TT, United Kingdom. This component uses a single optical device to track when face one of a die is facing a player. This component also monitors the number of steps made by the motor. The gaming device processor uses this information to perform a calculation. This calculation takes into account the specific gear ratios of the component and the type of motor used (such as, whether the motor is a twenty-four step motor or otherwise). If the gears do not skip and the motor functions properly, the calculation determines when the die is displaying a second face, a third face and so on. However, if the gears skip or if the motor malfunctions, the calculation yields erroneous information.

As in many devices which involve gears, the gears periodically skip, as is the case with this component. When the gears skip, the component sends signals to the gaming device processor which specify that a particular face is displayed when in reality that face is only partially displayed or worse, a different face is actually displayed to the player. This misinformation is problematic for operators of casinos because it creates frustration and dissatisfaction among the customers.

There are no known gaming devices which use an award indicator which includes award values affixed to a plurality of rotating mechanical dice wherein the dice indicate the award won by the player. In addition, there are no known gaming devices which include numbers or dots affixed to rotating mechanical dice and a table of different ranges of numbers or dots, wherein the ranges are associated with different awards. Furthermore, there are no known gaming devices having die rotators which produce reliable and accurate die position information during and after a complete rotation of the dice.

To increase player enjoyment and excitement, it is desirable to provide players with new gaming devices with new and reliable mechanical award indicators.

SUMMARY OF THE INVENTION

The gaming device of the present invention, in one embodiment, includes a plurality of sequentially activated mechanical award indicators and specifically a plurality of rotatable mechanical dice. Each die has at least one award value on or affixed to at least one of the faces of the die, and the gaming device uses the dice to sequentially indicate components of predetermined or randomly determined game outcomes. These game outcomes can occur in primary games or in secondary games, such as bonus rounds. For example, a player may win a predetermined total award in a slot game, wherein different dice rotate to display different components or parts of the total award. In one such embodiment, the sum of all of the partial awards displayed on all of the dice equals the amount of the total award.

In one embodiment of the gaming device, the award indicator includes a plurality of die rotators which rotate a plurality of dice. Each die is the same in structure, but preferably each die bears different award values or award symbols. In one embodiment, each die includes six sides or faces including one visible side or face presented to the player. Preferably, the visible face is pointed downward or outward in the direction of the player, oriented at an angle with respect to the cabinet surface of the gaming device. The award value symbols and other symbols are attached or affixed to each die in any suitable manner, preferably with decals.

In operation, when a predetermined event occurs during a game, the processor, as instructed by a predetermined game program, uses a random number generator to generate an outcome for a player. In one embodiment, the random number generator includes predetermined randomizing instructions and predetermined data stored in the data storage device. The outcome could be any suitable predetermined award value or no value at all. The processor uses the mechanical award indicator of the present invention to indicate the outcome to the player.

Specifically, the award indicator rotates some or all of the dice. The processor stops the rotation of the dice, preferably in a predetermined rotational order (such as from bottom to top), and each die then displays an award value on its visible face. The gaming device provides the player with the sum of all of these award values, and the award indication process terminates.

In another embodiment, the processor operates the award indicator so that the die rotators provide different rotations of the different dice. Each die has a different predetermined rotation, and each die stops rotating at a different time, preferably in a random order. When a die stops rotating, its visible face may or may not display an award value. For example, the visible face may display a value of zero, a terminator symbol or any other predetermined symbol. In any case, the player receives the award values which appear on the visible faces of the die.

In another embodiment, the dice bear award values and multipliers. The term multiplier, as used herein, can include any numerical factor which is used to increase or decrease an award value. Preferably, the multiplier is a number greater than one. After a predetermined event occurs and the processor generates an outcome, the processor causes the award indicator to rotate all of the dice. When the dice stop rotating, the visible faces display either award values or multipliers. If the visible faces display only award values, the player receives the sum of all such award values. If, however, a multiplier is displayed on one or more visible faces, the player receives: (a) the sum of all award values displayed on all of the visible faces multiplied by (b) the sum of all multipliers.

In another embodiment, the gaming device of the present invention includes an award indicator, wherein the die rotators are configured in a vertical or staircase fashion. It should be appreciated, however, that the die rotators can have a vertical, horizontal, circular or any other suitable configuration in this embodiment. In the staircase configuration, one of the dice is mounted at a low position on the cabinet surface and one die is mounted at a higher position on the cabinet surface. One or more dice are positioned between such high and low dice. In this embodiment, the dice bear bonus awards, move indicators and terminator symbols. When the move indicator is obtained, the processor rotates one or more predetermined dice associated with or indicated by the move indicator.

In one example of this embodiment, when a predetermined event occurs during a game, the processor generates an outcome, and initially a die rotator rotates the die at the lowest position on the cabinet surface. When the die rotator stops the rotation of this die, if an upwardly pointing move indicator is displayed on the visible face of this die, the processor causes the next higher die to rotate.

Each time a die rotator rotates and then stops rotating a die, the die's visible face will either display an award value, a move indicator or a terminator. As long as the player avoids move indicators and terminators, the die rotator will repeatedly rotate the same die, stop the die and display an award value. The player will receive all such award values. If the player reaches a move indicator, the next highest die will then be rotated. This process continues until the player reaches the highest die or a terminator symbol, whichever comes first. It should be appreciated that in various embodiments of the present invention, the terminator symbol can indicate the termination of a particular die rotation or the termination of the entire award indication process.

In an alternative embodiment, the move indicator indicates to a player a predetermined number of moves and a direction of movement. For example, a move indicator may bear a label such as, "3 LEFT" or "2 UP." The gaming device causes one of the dice to rotate in accordance with such indications.

In another embodiment of the gaming device of the present invention, the award indicator includes five die rotators which rotate five dice. Various award values are affixed to each side or face of the dice. Each die is separately associated with a reel in the primary slot game of the gaming device. In addition, the symbols appearing on the reels include at least one predetermined symbol which triggers the award indicator. In operation of one example of this embodiment, a player spins the reels and a die symbol appears on the payline of the reels. The processor determines an outcome for the player. Then the processor causes the die rotator associated with this reel to cause a predetermined rotation of the die in its rotator. When this die stops rotating, the player sees an award value, and the gaming device terminates the award indication process and provides this award value to the player.

In an alternative embodiment of the present invention, the gaming device enables the player to accept or reject certain award values displayed by the dice. The gaming device may enable the player to exercise this option while the dice are rotating or after they stop rotating. Preferably, after the processor causes the dice to rotate, the processor enables the player to accept or reject preferably all of the award values which the dice display to the player. If the player accepts the award values, the gaming device provides the accepted award values to the player, and the award process terminates. If the player rejects the award values, the processor causes the dice to rotate again. This process of accepting or rejecting award values may repeat itself multiple times.

In another embodiment of the present invention, the gaming device includes a predetermined table or scale which includes predetermined ranges of award values, numbers, dots, counting symbols, points or other types of numerical representations displayed on the dice. Each range is associated with a predetermined award value. Depending upon which range a player reaches, the player will obtain different award values.

The die rotator of the gaming device of the present invention can include any suitable electrical and mechanical parts which enable the gaming device to perform predetermined rotations of mechanical dice. In one embodiment, the die rotator includes two optical devices or readers which enable the gaming device processor to track and control the movement of the dice. One such optical device or reader enables the processor to determine when a home face or face one for each die is most visible to the player. The other optical device or reader is connected and secured to the drive shaft or motor shaft of the die rotator. The motor shaft works in conjunction with this optical device to enable the processor to count how many faces pass through the visible position as the die is rotated. When face one passes through the visible position, the processor begins this count which informs the processor as to what face is displayed to the player at any one point in time. Preferably, the die rotator generates the visual effect of tumbling dice in free space with three dimensional movement.

The gaming device of the present invention, in one embodiment, includes an award indicator which involves predetermined rotation of mechanical dice. Preferably, at least one award value is affixed to each of the die. The gaming device uses the mechanical dice to indicate predetermined award outcomes to players. This type of gaming device increases the excitement and entertainment experienced by gaming device players.

It is therefore an advantage of the present invention to provide a gaming device having a mechanical award indicator.

Another advantage of the present invention is to provide a gaming device having an award indicator with rotating mechanical dice.

Yet another advantage of the present invention is to provide an award indicator for a gaming device which provides a player with award information and entertainment.

Still another advantage of the present invention is to enhance the indication of game outcomes to players.

Another advantage of the present invention is to increase the attraction of a gaming device.

Yet another advantage of the present invention is to provide a gaming device which includes mechanical die rotators which reliably provide die position information to the gaming device processor.

Still another advantage of the present invention is to provide a gaming device which uses mechanical dice which bear award values to indicate award outcomes to players.

Additional features and advantages of the present invention are described in, and will be apparent from, the following Detailed Description of the Invention and the figures.

BRIEF DESCRIPTION OF THE FIGURES

FIG. 11 is a table which illustrates example outcomes associated with various dice faces in one embodiment of the present invention.

DETAILED DESCRIPTION OF THE INVENTION

Gaming Device and Electronics

Figure 1A:
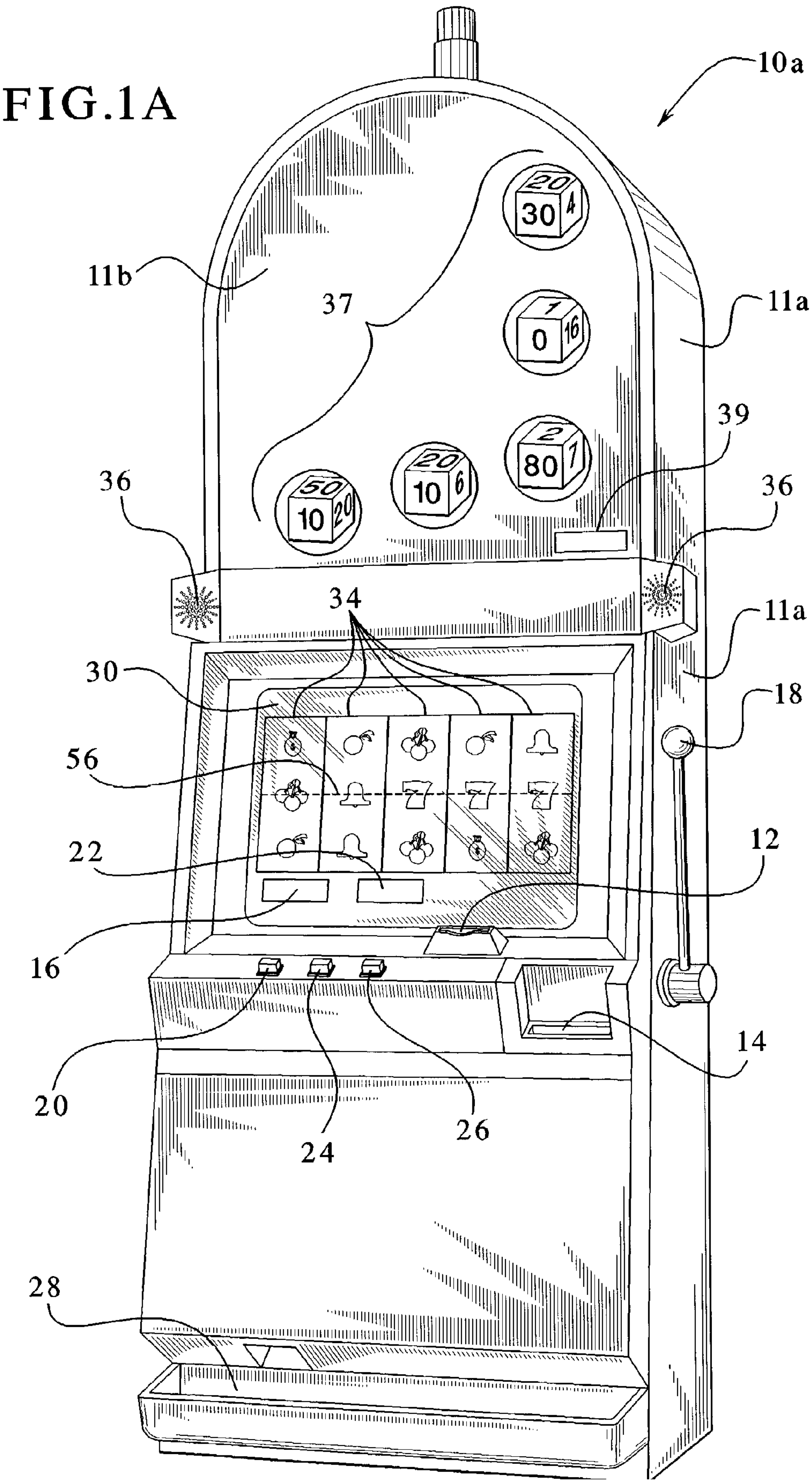
FIG. 1A is a perspective view of one embodiment of the gaming device of the present invention.
Figure 1B:
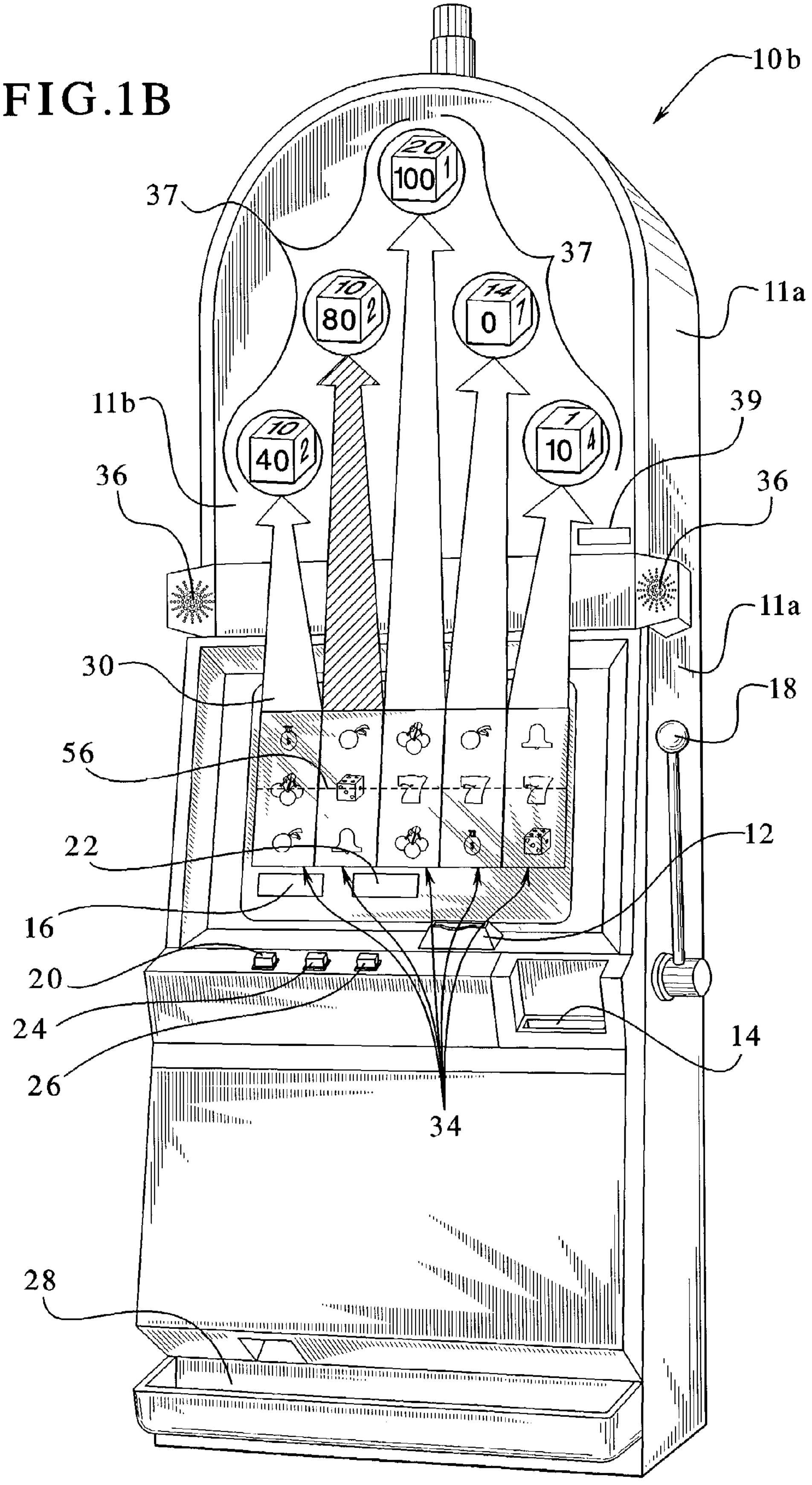
FIG. 1B is a perspective view of one embodiment of the gaming device of the present invention.

Referring now to the drawings, two embodiments of the gaming device of the present invention are illustrated in FIGS. 1A and 1B as gaming device 10*a* and 10*b*, respectively. Gaming device 10*a* and/or gaming device 10*b* are generally referred to herein as gaming device 10. Gaming device 10 includes a cabinet 11 which in includes a body 11*a* and an outer cabinet surface 11*b*. The cabinet 11 of gaming device 10 is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs. Gaming device 10 can incorporate any suitable game apparatus for operating any primary game such as slot, blackjack, poker and keno, any of their bonus triggering events and any of their secondary and bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button device 20.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiments shown in FIGS. 1A and 1B include a central display device 30, but other embodiments (not shown) can include a central display device and an upper display device. Gaming device 10 displays a plurality of reels 34, such as three to five reels 34 in mechanical or video form at the display device 30. However, it should be appreciated that the display devices can display any game apparatus or any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor. Each reel 34 displays a plurality of indicia such as dice, bells, hearts, fruits, numbers, letters, bars or other images which preferably correspond to a theme associated with the gaming device 10. Furthermore, gaming device 10 preferably includes speakers 36 for making sounds or playing music. In addition, gaming device 10 includes an award indicator 37 which the gaming device uses to indicate award values to players, as described in detail below.

Figure 2:
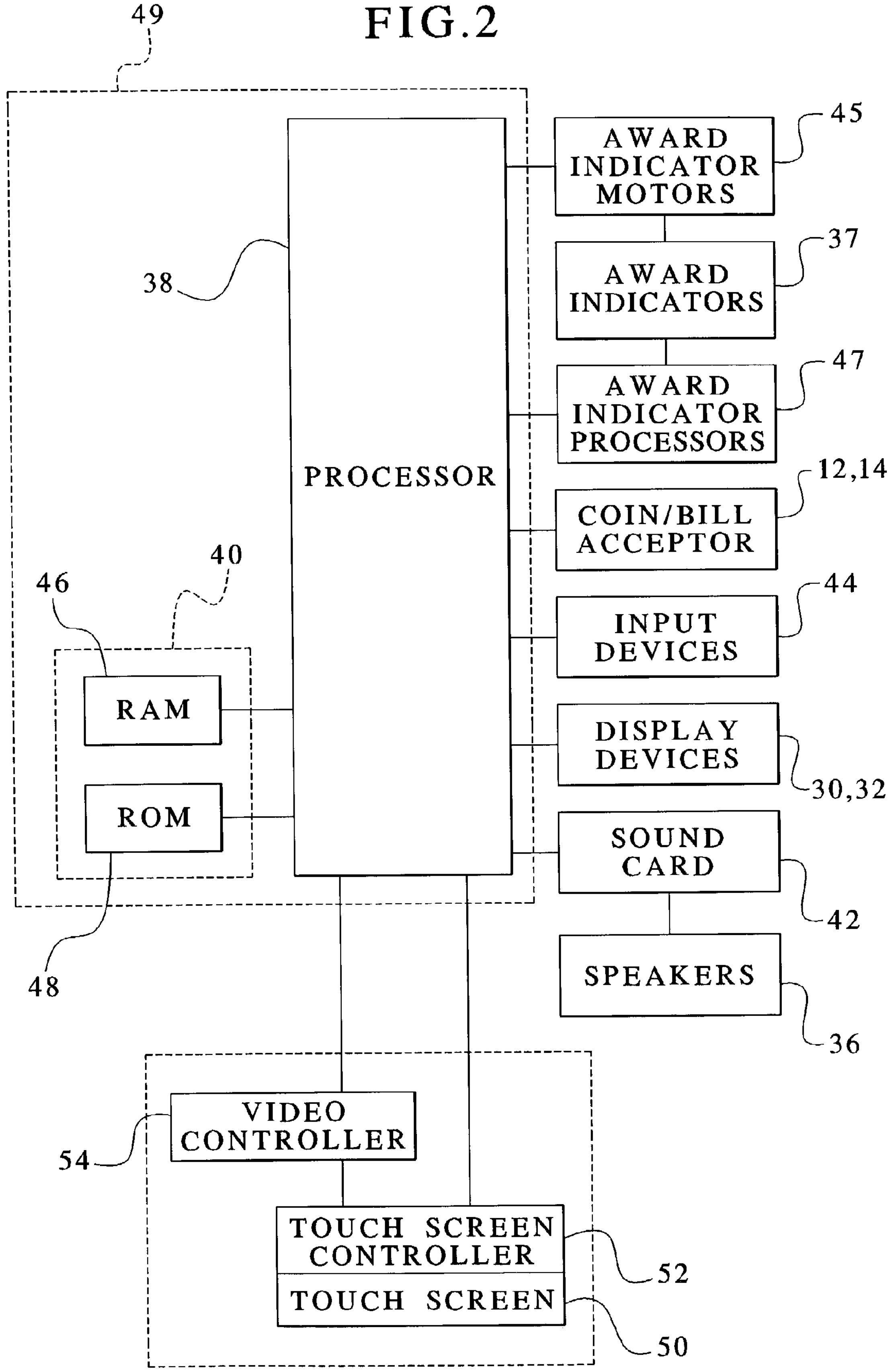
FIG. 2 is a schematic block diagram of the electronic configuration of one embodiment of the gaming device of the present invention.

As illustrated in FIG. 2, the general electronic configuration of gaming device 10 preferably includes: a processor 38; a memory device or data storage device 40 for storing program code or other data; a display device 30; a sound card 42; a plurality of speakers 36; one or more input devices 44; one or more, and preferably a plurality of award indicator motors 45 and a plurality of award indicator processors 47. The processor 38 is preferably a microprocessor or microcontroller-based platform which is capable of displaying images, symbols and other indicia such as images of people, characters, places, things and faces of cards. The data storage device 40 can include random access memory (RAM) 46 for storing event data or other data generated or used during a particular game. The data storage device 40 can also include read only memory (ROM) 48. ROM 48 preferably stores program code which controls the gaming device 10 so that it plays a particular game in accordance with applicable game rules and pay tables, and ROM 48 also preferably stores software or code which instructs the processor to control the motors 45 in a predetermined manner.

It is also preferable that the data storage device 40 stores certain dice data, specifically a plurality of outcomes associated with different faces of the dice rotated by the award indicator 37. When the gaming device generates awards, this dice data enables the gaming device to indicate the generated awards by using the mechanical dice, as described in detail below. For verification purposes, after the dice indicate the generated award, the gaming device also displays the generated award at the vacuum fluorescent display (VFD) 39. In case the dice do not accurately indicate the generated award, VFD 39 functions as the official display of the player's award.

As illustrated in FIG. 2, the player preferably uses the input devices 44, such as pull arm 18, input-indicator button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate locations. As further illustrated in FIG. 2, the processor 38 can be connected to coin slot 12 or bill acceptor 14. The processor 38 can be programmed to require a player to deposit a certain amount of money in order to start the game. The motors 45 are coupled to the award indicator 37. The processor 38 communicates with the award indicator processors 47 which in turn control the operation of the award indicator 37 as described in detail below.

It should be appreciated that although a processor 38 and data storage device 40 are preferable implementations of the present invention, the present invention can also be implemented using one or more application-specific integrated circuits (ASIC's) or other hard-wired devices, or using mechanical devices (collectively or alternatively referred to herein as a "processor"). Furthermore, although the processor 38 and data storage device 40 preferably reside on each gaming device 10 unit, it is possible to provide some or all of their functions at a central location such as a network server for communication to a playing station such as over a local area network (LAN), wide area network (WAN), Internet connection, microwave link, and the like. Accordingly, the processor 38 and memory device 40 can communicate with a suitable network 49. The processor 38 and memory device 40 is at times generally referred to herein as the "computer" or "controller."

With reference to FIGS. 1A, 1B and 2, to operate the gaming device 10 in one embodiment the player must insert the appropriate amount of money, tokens or otherwise currency at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may reach an award outcome and win additional credits, or the player may reach a non-award outcome and win no credits.

In addition to winning credits in this manner, the gaming device 10 may also give players the opportunity to win credits in a secondary game, such as a bonus round. This type of gaming device 10 will include a program which will automatically begin a bonus round when the player has achieved a qualifying condition in the game. This qualifying condition can be a particular arrangement of one or more indicia on a display device. The gaming device 10 may use a video-based display device 30 to enable the player to play the bonus round. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Award Indicator with Rotating Mechanical Dice

Figure 3:
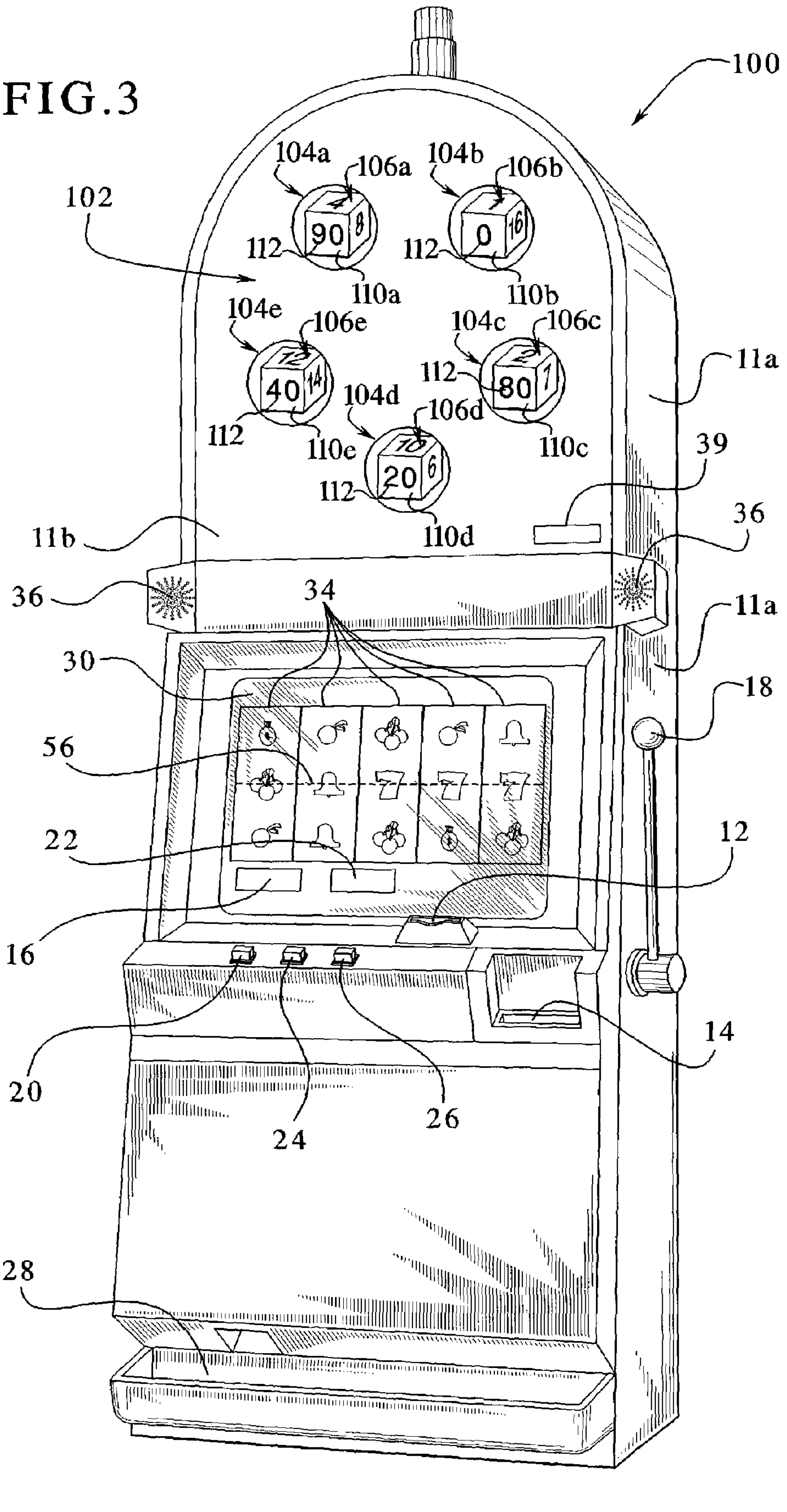
FIG. 3 is a perspective view of one embodiment of the gaming device of the present invention, illustrating one embodiment of an award indicator.
Figure 4:
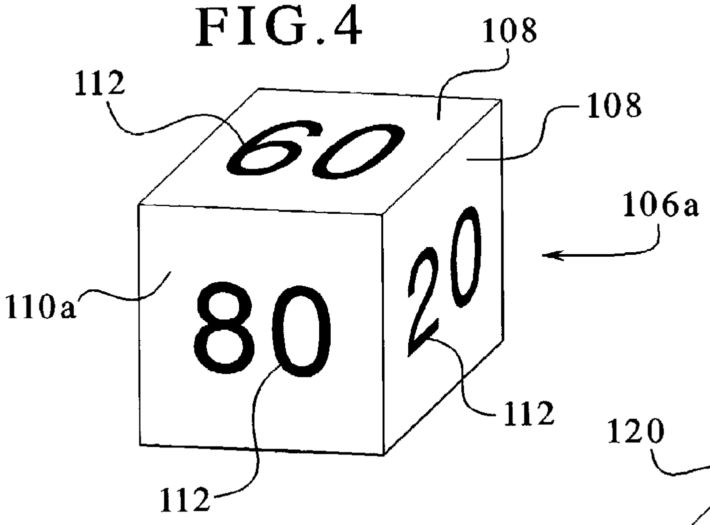
FIG. 4 is a perspective view of a die in one embodiment of the present invention illustrating award values affixed to the die.

As illustrated in FIGS. 3 and 4, in one embodiment gaming device 100 includes an mechanical award indicator 102. In this embodiment, mechanical award indicator 102 includes a plurality of die rotators 104*a* to 104*e* which rotate dice 106*a* to 106*e*, respectively. Each die is the same in structure and preferably each die bears different award values. As illustrated in FIG. 4, die 106*a* includes six sides or faces 108 including one visible face 110*a*. Visible faces 110*a* to 110*e* are illustrated for each die in FIG. 3. The visible faces are visible to a player when the dice are within the die rotator 104*a*. Preferably, each visible face is oriented in a downward direction so that the plane of the visible face is substantially perpendicular to the player's line of sight when the player looks upward at the cabinet surface 11*b* of the gaming device 100.

As further illustrated in FIG. 4, each side or face of die 106*a*, including the visible face 110*a*, displays an award value or award value symbol 112. The award value can be attached or affixed to the die in any suitable manner, including, without limitation, through the use of decals, stickers, painting and engraving. It is preferable that each die has a predetermined color which is consistent with the theme of the gaming device.

In operation, when a predetermined event occurs during a game, the processor implements the instructions of the game program and uses a random number generator or certain data stored in the data storage device to generate an outcome for a player. The outcome could be a randomly or predetermined award value or no value at all. The processor then uses the mechanical award indicator 102 to indicate the outcome to the player. The present invention thus provides a mechanical award indicator for indicating awards and particularly bonus awards to the player.

In one embodiment, the award indicator rotates all of the dice 106*a* to 106*e*. The award indicator stops the rotation of all of the dice, preferably in a sequential order and the dice display award values on their visible faces 110*a* to 110*e*. The gaming device provides the player with the sum of all of these award values, and the award indication process terminates.

In the example illustrated in FIG. 3, the outcome is an award value of two hundred thirty credits (ninety plus zero plus eighty plus twenty plus forty). It should be appreciated, however, that the gaming device can indicate an outcome based on any suitable computer program which includes one or more mathematical calculations involving the award values displayed on the dice. For example, the processor can add the award values, multiply the award values, divide certain award values by other award values or apply any predetermined program or mathematical formula to the award values. The gaming device would then indicate the final award value to the player after performing such a mathematical calculation.

With continued reference to FIG. 3, in another embodiment the processor operates the mechanical award indicator 102 so that the die rotators 104*a* to 104*e* provide different rotations of the different dice 106*a* to 106*e*. Because each die has a different predetermined rotation, each die stops rotating at a different time, preferably randomly in a non-sequential order. When a die stops rotating, its visible face may or may not display an award value. For example, the visible face may display a value of zero, a terminator symbol or any other symbol desired by the game implementor. In one alternative embodiment, the player receives the award values appearing on only one or certain of the visible faces of the dice, such as the first die to stop rotating. For example, if die 106*c* were the first to stop rotating, the player would receive an award value of eighty credits. This provides a new and different method of indicating the player's bonus award to the player.

Figure 6:
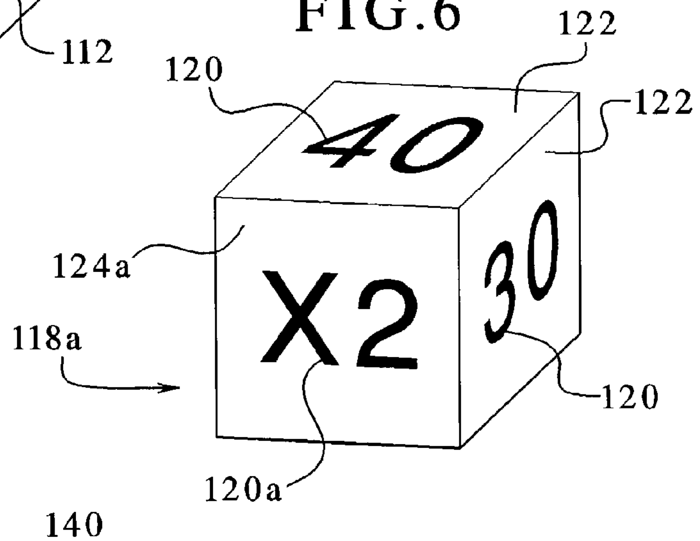
FIG. 6 is a perspective view of a die in one embodiment of the present invention illustrating a multiplier and award values affixed to the die.
Figure 5:
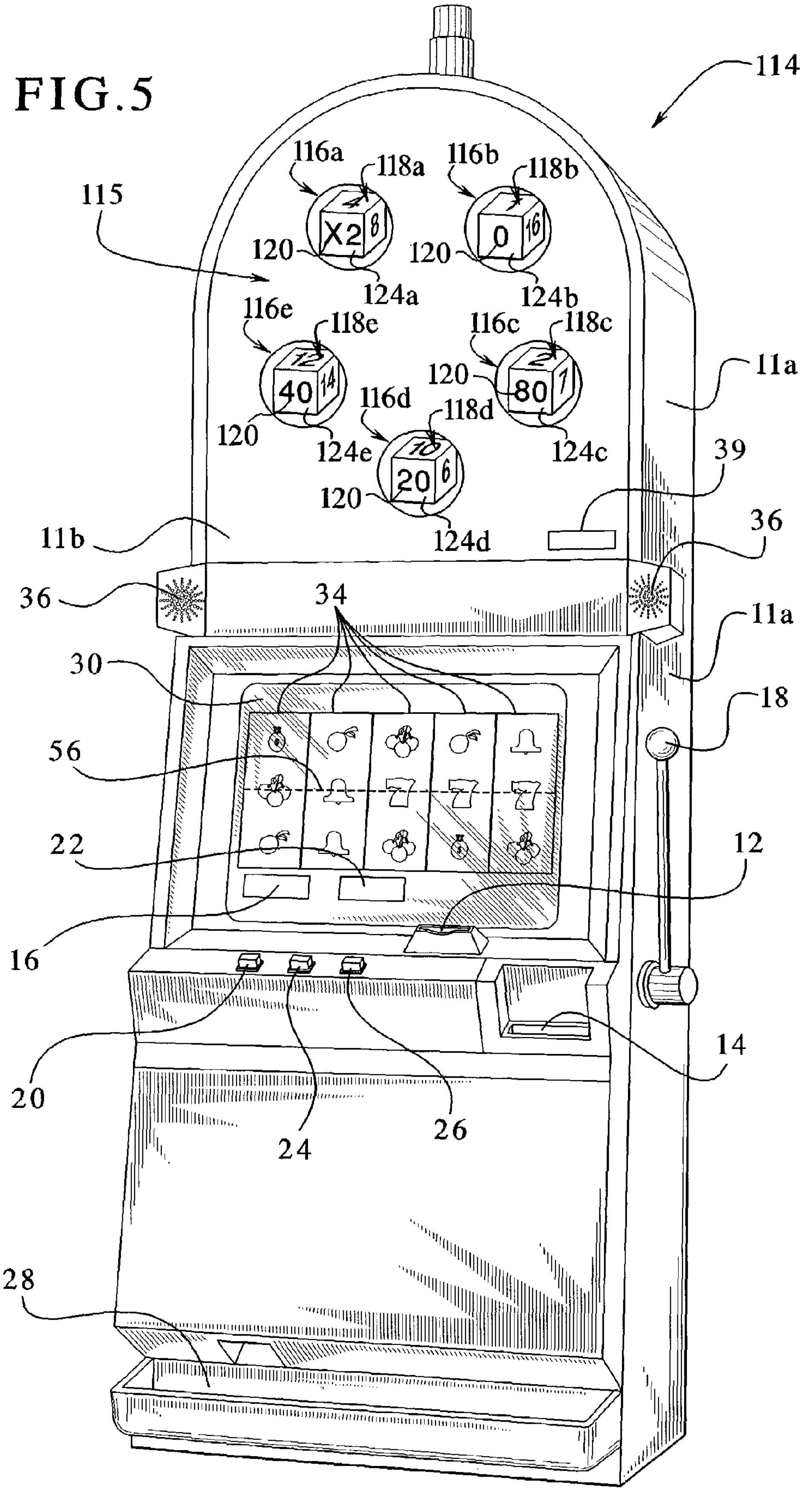
FIG. 5 is a perspective view of one embodiment of the gaming device of the present invention, illustrating one embodiment of an award indicator.

In another embodiment illustrated in FIGS. 5 and 6, gaming device 114 includes award indicator 115 which includes die rotators 116*a* to 116*e* which rotate dice 118*a* to 118*e*. The dice bear award values and multipliers. As illustrated in FIG. 6, award values 120 are affixed to sides 122 of die 118*a*, and a multiplier 120*a* is affixed to the visible face 124*a* of die 118*a*.

After a predetermined event occurs in a game and the processor generates an outcome, the processor causes the award indicator 115 to rotate all of the dice. When the dice stop rotating, the visible faces 124*a* to 124*e* display either award values or multipliers. If the visible faces display only award values, the player receives the sum of all such award values. If, however, a multiplier 120*a* is displayed on one or more visible faces, the player receives: (a) the sum of all award values displayed on all of the visible faces multiplied by (b) the sum of all multipliers. In the example illustrated in FIG. 5, the visible faces display: a two multiplier, zero credits, eighty credits, twenty credits and forty credits. The player would receive an award value of two hundred eighty credits (i.e., (two)×(zero plus eighty plus twenty plus forty)).

Figure 8:
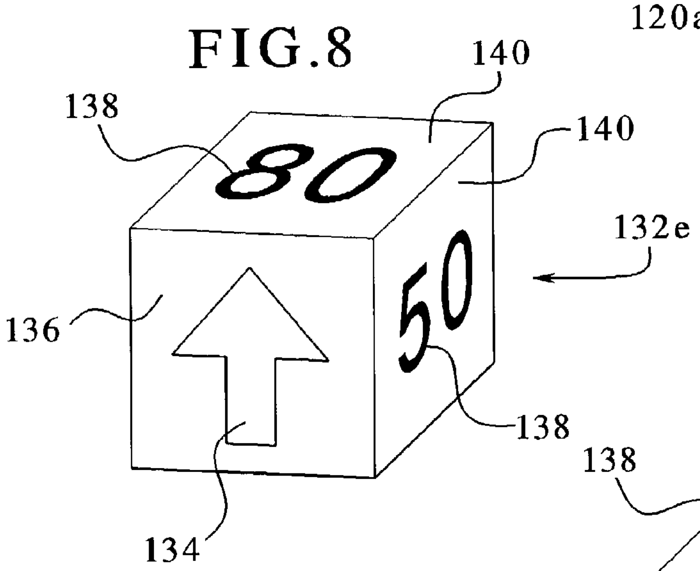
FIG. 8 is a perspective view of a die in one embodiment of the present invention illustrating a move indicator and award values affixed to the die.
Figure 9:
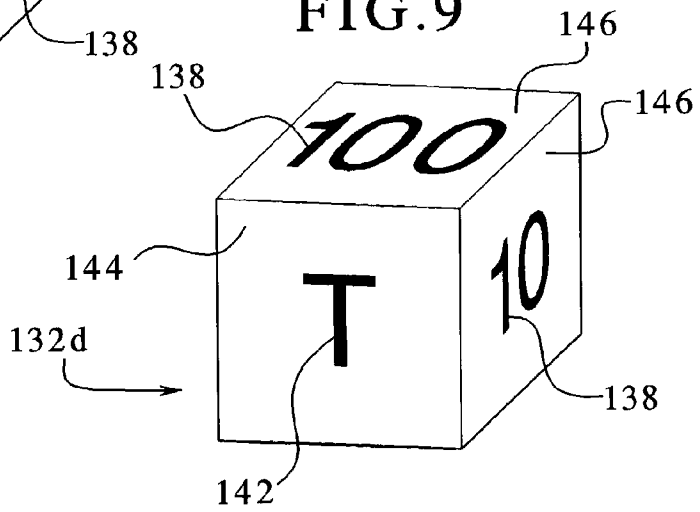
FIG. 9 is a perspective view of a die in one embodiment of the present invention illustrating a terminator symbol and award values affixed to the die.
Figure 7:
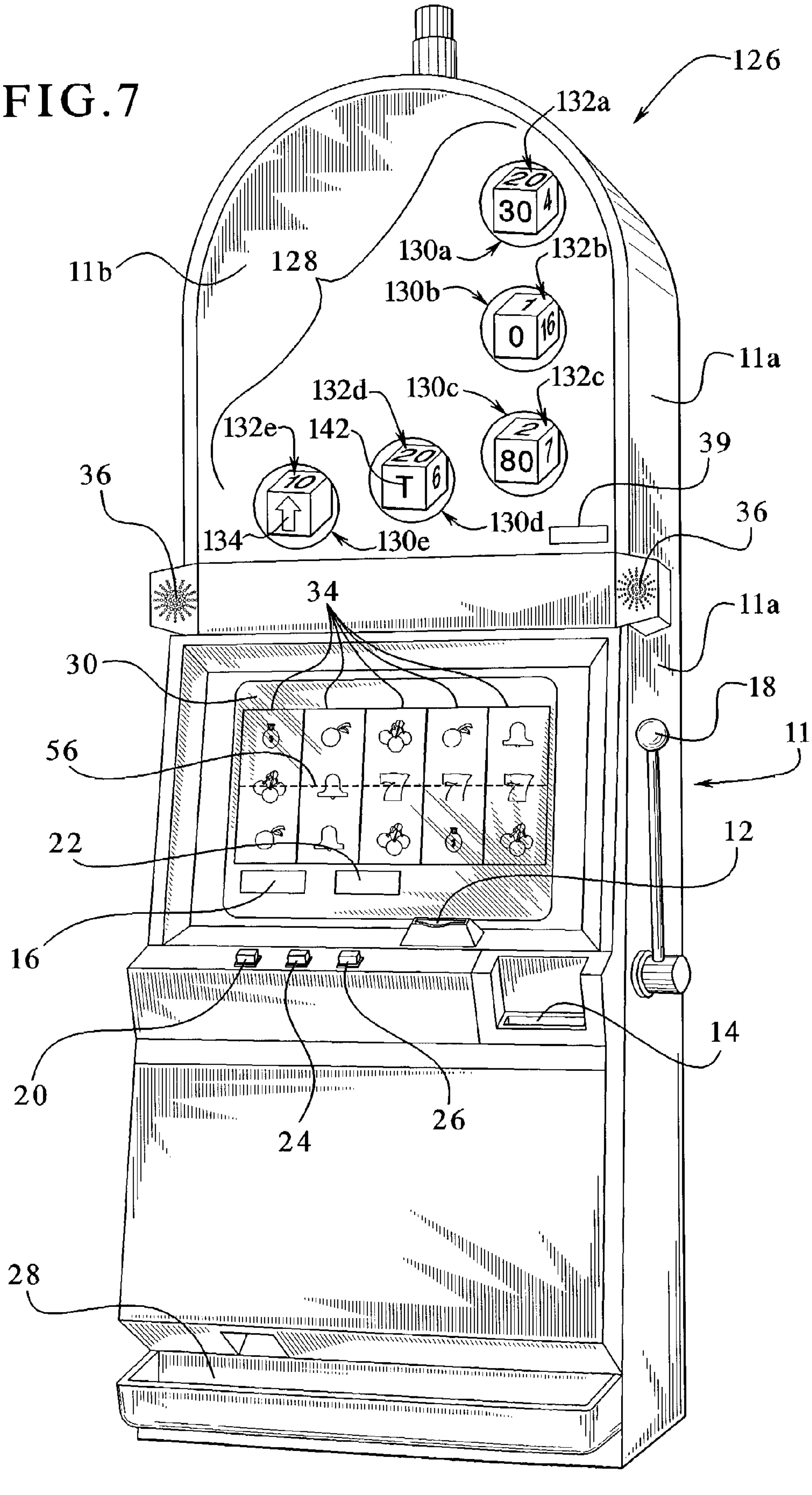
FIG. 7 is a perspective view of one embodiment of the gaming device of the present invention, illustrating one embodiment of an award indicator.

As illustrated in FIGS. 7, 8 and 9, in another embodiment gaming device 126 includes an award indicator 128 wherein the die rotators 130*a* to 130*e* are preferably configured in somewhat of a staircase fashion. The die rotators 130*a* to 130*e* rotate dice 132*a* to 132*e*. Die 132*e* has the lowest position on the cabinet surface 11*b*, and 132*a* has the highest position on the cabinet surface 11*b*. The dice bear bonus awards, move indicators and preferably terminator symbols. With reference to FIG. 8, a move indicator 134 is affixed to the visible face 136 of die 132*e*, and award values 138 are affixed to the other sides 140 of die 132*e*. As illustrated in FIG. 9, a terminator symbol 142 is affixed to the visible face 144 of die 132*d*, and award values 138 are affixed to the other sides 146 of die 132*d*.

In one example of this embodiment, when a predetermined event occurs during a game and the processor generates an outcome, initially die rotator 130*e* rotates die 132*e*. When die rotator 130*e* stops the rotation of die 132*e*, move indicator 134 is displayed on the visible face 136 of die 132*e*. The processor then causes the next higher die 132*d* to rotate. Die rotator 130*d* then rotates die 132*d*.

Each time a die rotator rotates and then stops rotating a die, the die's visible face will either display an award value, a move indicator or a terminator. As long as the player avoids move indicators and terminators, the die rotator will repeatedly rotate the same die, stop the die and display an award value. The player will receive all such award values. If the player reaches a move indicator, the next highest die will be rotated. This process continues until the player reaches the highest die 132*a* or a terminator symbol, whichever comes first.

In the example illustrated in FIG. 7, the player may have received one or more award values from die 132*e* until move indicator 134 was displayed. Then, the player may have received one or more award values displayed on die 132*d* until terminator 142 was displayed. At that point, the processor terminates the award indication process and provides the player with his or her payout. It should be appreciated that although the move indicator is illustrated in FIGS. 7 and 9 as an upwardly pointing arrow, in various embodiments the move indicator can include any suitable symbol pointing upward, downward, side to side, clockwise, counterclockwise or in any other predetermined direction.

In one alternative embodiment, the move indicator indicates to a player a predetermined number of moves and a predetermined direction of movement. When a die displays such a move indicator to a player, the processor causes the die whose position is specified by the move indicator to move. For example, four dice could be aligned in a vertical formation, and a move indicator on a current die may display the message, "2 UP." The processor would cause the rotation of the second die which is located above the current die.

In another alternative embodiment, the dice do not bear terminator symbols, but only bonus awards and move indicators. The player gains award values through repeated rotations of the same die until the player reaches a move indicator. Eventually, the player will reach the last die. When the last die displays a move indicator or another predetermined symbol, the award process of the gaming device terminates.

Figure 10:
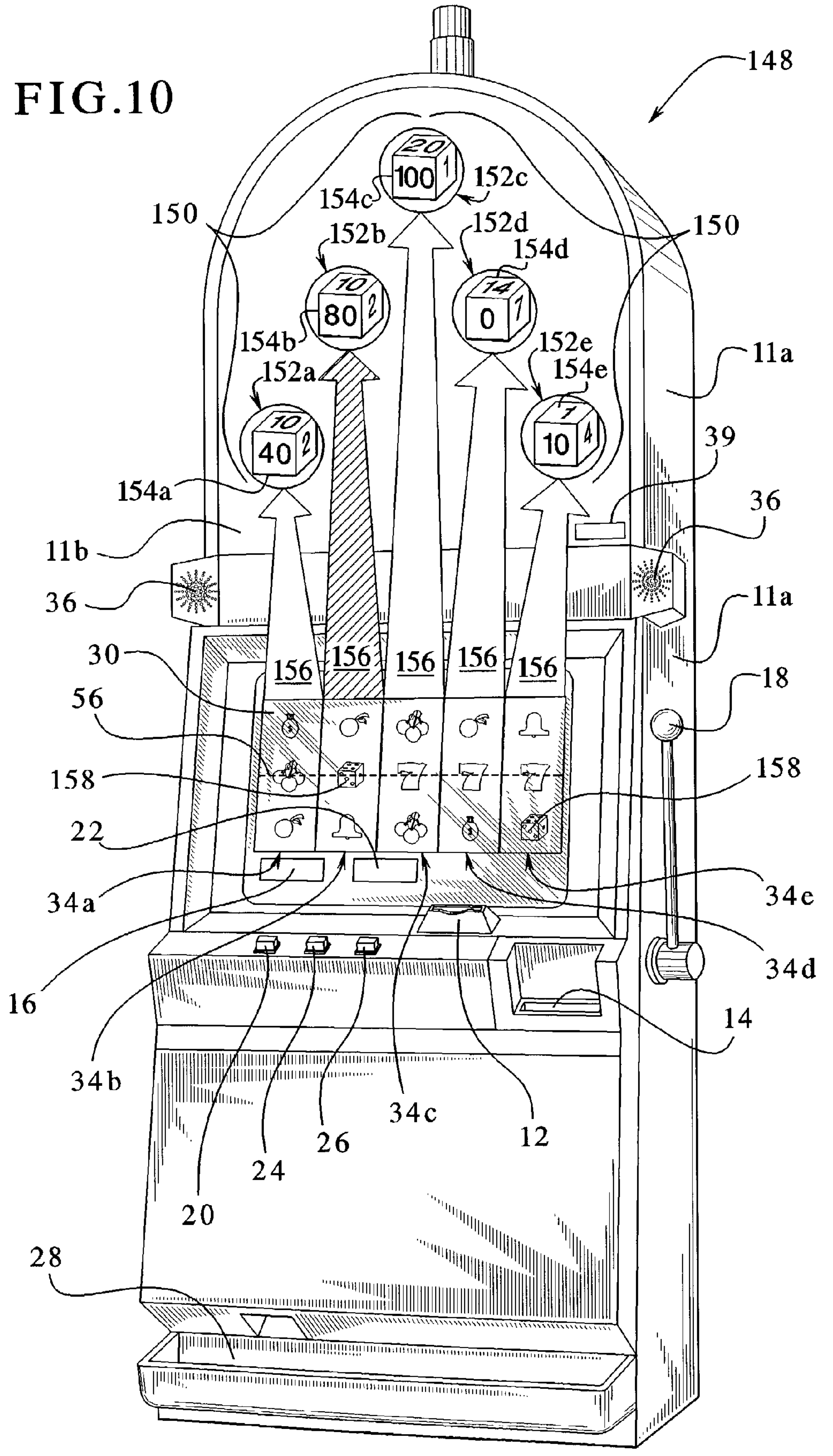
FIG. 10 is a perspective view of one embodiment of the gaming device of the present invention, illustrating dice associated with reels in one embodiment of an award indicator.

In another embodiment illustrated in FIG. 10, gaming device 148 includes award indicator 150. Award indicator 150 includes five die rotators 152*a* to 152*e* which rotate dice 154*a* to 154*e*, respectively. Various award values are affixed to each side of the dice. Each die is separately associated with a reel. For example, and as indicated by the arrows 156, reel 34_a_ is associated with die 154_a_, reel 34_b_ is associated with die 154_b_, reel 34_c_ is associated with die 154_c_, reel 34_d_ is associated with die 154_d_ and reel 34_e_ is associated with die 154_e_. In addition, the symbols appearing on the reels 34_a_ to 34_e_ include at least one predetermined symbol which triggers the award indicator 150. In this example, the die symbol 158 triggers the rotation of a die if the die symbol 158 appears on the payline 56.

In operation of one example of this embodiment, a player spins the reels and a die symbol 158 appears on reel 34_b_ on the payline 56. The processor automatically determines an outcome for the player. Then the processor causes the die rotator 152_b_, which is associated with reel 34_b_, to cause a predetermined rotation of die 154_b_. When die 154_b_ stops the rotation, the player sees an award value of eighty credits on the visible face of the die 154_b_. The gaming device then terminates the award indication process and provides this award value to the player.

In one embodiment of the present invention, the gaming device enables a player to accept or reject certain outcomes or award values generated by the processor. The processor may generate an award value, use the award indicator to indicate the award value to the player and provide the player with the option of accepting or rejecting the award value. If the player accepts the award value, the award indication process terminates. If the player rejects the award value, the processor generates another award value, and the entire process repeats itself at least once.

It should be appreciated that although it is preferable that the processor causes all of the mechanical dice to rotate, in various embodiments the processor may only cause one or a select number of the dice to rotate. At that point, the gaming device will provide the player with the indicated award values.

In one embodiment of the present invention, the dice display points to the player in the form or numerals, dots or other symbols. When the dice stop rotating, the player receives a score which is preferably the sum of all points displayed on the visible faces of the dice. The storage device stores at least one table or scale which includes a plurality of score ranges. Each score range is associated with a predetermined award value. The score range within which a player falls, determines the award value which the player will receive.

For example, a gaming device may include: (a) a score range of zero to one hundred points associated with an award value of five hundred credits; (b) a score range of one hundred to three hundred points associated with an award value of one thousand credits; and (c) a score range of three hundred to one thousand points associated with an award value of three thousand credits. In operation, the processor may cause the dice to rotate. When the dice stop rotating, the visible faces of the dice will display predetermined points. If the sum of the displayed points is ten, the player receives five hundred credits, if the sum is two hundred, the player receives one thousand credits, and if the sum is three hundred fifty, the player receives three thousand credits.

In an alternative embodiment, the dice display award values. The gaming device includes a plurality of award ranges which define ranges for award values. Each award range is associated with a predetermined award value or award modifier. The award modifier includes any numerical factor or mathematical formula or function which modifies an award value. For example, an award range of zero to fifty credits can be associated with an award value of ten credits, an award value of fifty to one hundred credits can be associated with an award value of three hundred credits or an award value range of one hundred to four hundred credits can be associated with a modifier which is a multiplication factor of five. The gaming device can automatically provide the player with the award value associated with the award range reached by the player. Alternatively, the gaming device may enable the player to choose whether or not to accept the award values displayed on the dice or the award value associated with the award range reached by the player. In the case of the modifier, the gaming device applies the modifier to the award values displayed on the visible faces of the dice and calculates an award value. The gaming device may automatically provide this award value to the player or do so at the player's option.

In operation of this embodiment, the processor causes the dice to rotate. When the dice stop rotating, the visible faces of the dice will display predetermined award values. If the sum of the award values falls within a predetermined award range, the player receives the award value which is associated with that award range or which results from the modifier associated with that award range. The associated award value may be larger than, smaller than or the same as the sum of the displayed award values.

In another embodiment, one or more of the dice, such as die 118_a_, displays an award indicator, such as value 120, and an award modifier symbol, such as multiplier 120_a_. Although the award indicator is preferably a numerical value, the award indicator can include any symbol or image which indicates an award to a player. The award modifier symbol can include a multiplier, any other mathematical symbol or any other symbol which indicates a particular modification to or calculation of an award. For example, the award modifier symbol can be an image of an apple. The apple image can be associated with a mathematical function which multiplies all of the values displayed on the dice by three, or the apple image can be associated with a mathematical function with adds together all of the values displayed on the dice. It should also be appreciated that the award indicator and the award modifier symbol can be positioned on the same side of a die.

For example, one side of a die can include an award indicator, such as the numeral one-hundred, adjacent to an award modifier symbol, such as an image of a banana. The banana may be associated with a mathematical function which multiplies the adjacent award indicator by two. In one embodiment, if a plurality of dice simultaneously display a predetermined quantity of award modifier symbols, such as three bananas, the gaming device provides the player with a jackpot award or other predetermined award. The gaming device then terminates the game. It should be appreciated that this embodiment can include rotatable dice or any other suitable rotatable mechanical objects which have: (a) a plurality of axes of rotation; and/or (b) a plurality of relatively flat sides or faces.

In operation of one example of this embodiment, the cabinet or display device of the gaming device may display: (a) a strawberry associated with a multiplication function of four; and (b) three strawberries associated with a jackpot award value of two thousand. All of the dice on the gaming device may initially display an image or message to a player, such a "SPIN TO WIN." Whether initiated by the gaming device processor or the player's input: (a) the first die may rotate and display a numerical value of fifty; (b) the second die may rotate and display a numerical value of twenty adjacent to a strawberry; (c) the third die may rotate and display a numerical value of one hundred; (d) the fourth die may rotate and display a value of two hundred; and (e) the fifth and final die may rotate and display a strawberry by itself. The player's award is calculated as follows: ((50+(20×3)+100+200)×3=1,230). The gaming device then provides this award to the player and terminates the game.

In another embodiment illustrated in FIGS. 19A to 20E, the outer cabinet surface 11*b* includes a matrix or grid 500 of mechanical objects 502 held by suitable object rotators (not shown). The mechanical objects 502 can include any suitable rotatable object. Preferably, each of the mechanical objects has a plurality of sides and/or a polygon shape, such as mechanical objects 502 or 504. Mechanical objects 504 include a ball 504*a,* a reel or wheel 504*b* or a pyramid 504*c*. For flat-sided mechanical objects, such as mechanical objects 502, 504*a* and 504*c,* preferably have a plurality of axes of rotation.

It is preferable that each of the mechanical objects 502 and 504*a* to 504*c* includes: (a) a pre-spin message or image 506, such as "SPIN!;" (b) at least one award indicator 508; and (c) at least one move indicator 510. The award indicator 508 is preferably a numerical value, though the award indicator 508 can be any symbol which indicates a particular value or award to the player. The move indicator 510 can include any suitable symbol, image or message which indicates which of the mechanical devices 502 will be rotated in sequence.

In one example of this embodiment, the grid 500 defines a plurality of sets, which in this example, are rows 512*a,* 512*b* and 512*c*. Each set or row is associated with a particular award level. Each award level is preferably the sum of all possible awards associated with the mechanical objects 502 in each of the rows 512*a* to 512*c*; or the likelihood or probability that the player will win a particular award by spinning the dice in each of the rows 512*a* to 512*c*. This award level preferably varies from row to row. In this example, the award level associated with the rows 512*a* to 512*c* increases from row 512*a* to row 512*b* to row 512*c*. Accordingly, as the player advances upward in the grid 500, the player's chances of gaining higher awards increases.

Figure 20A:
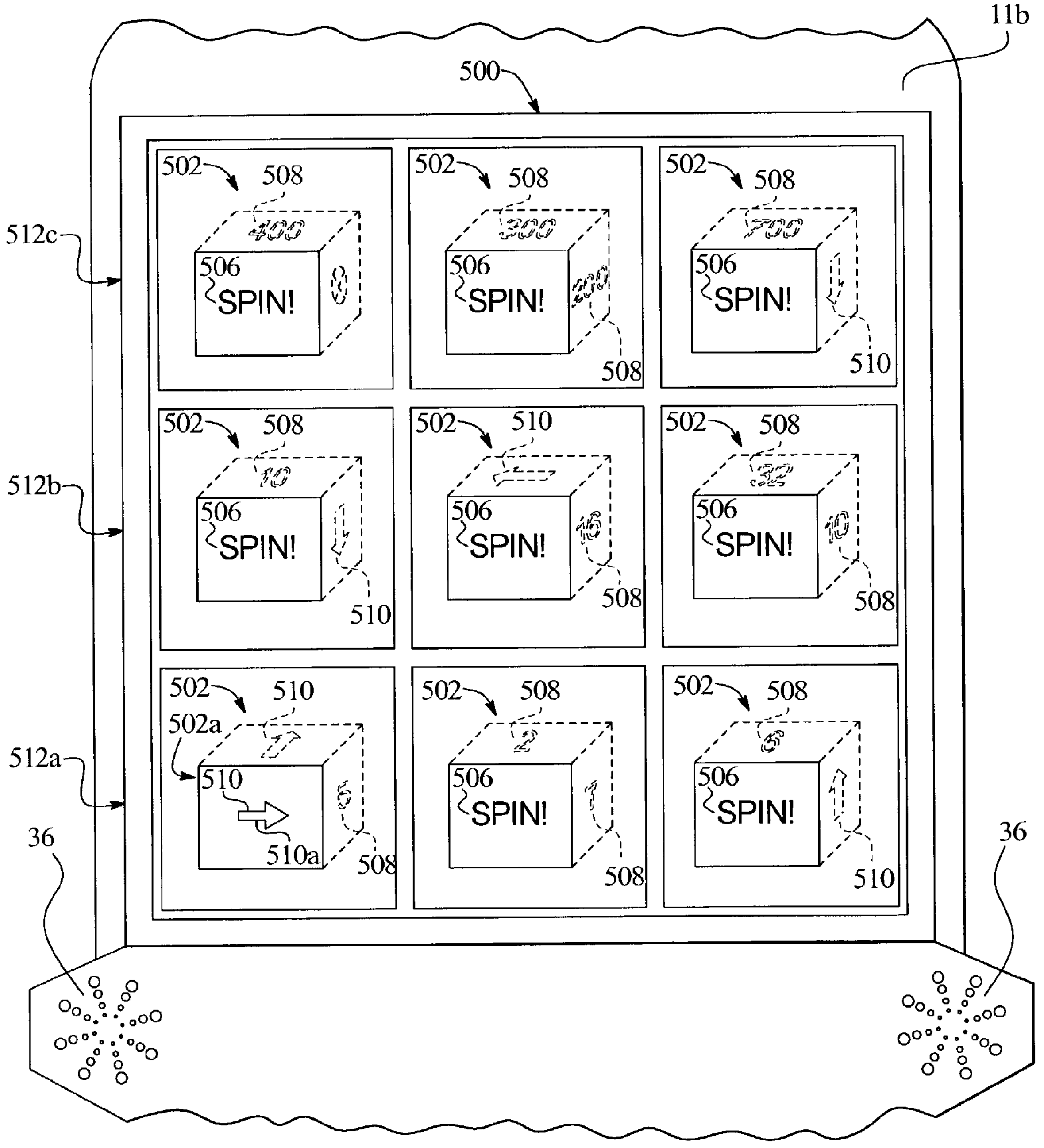
FIGS. 20A to 20E are perspective views illustrating an example game of one embodiment of the present invention.
Figure 20B:
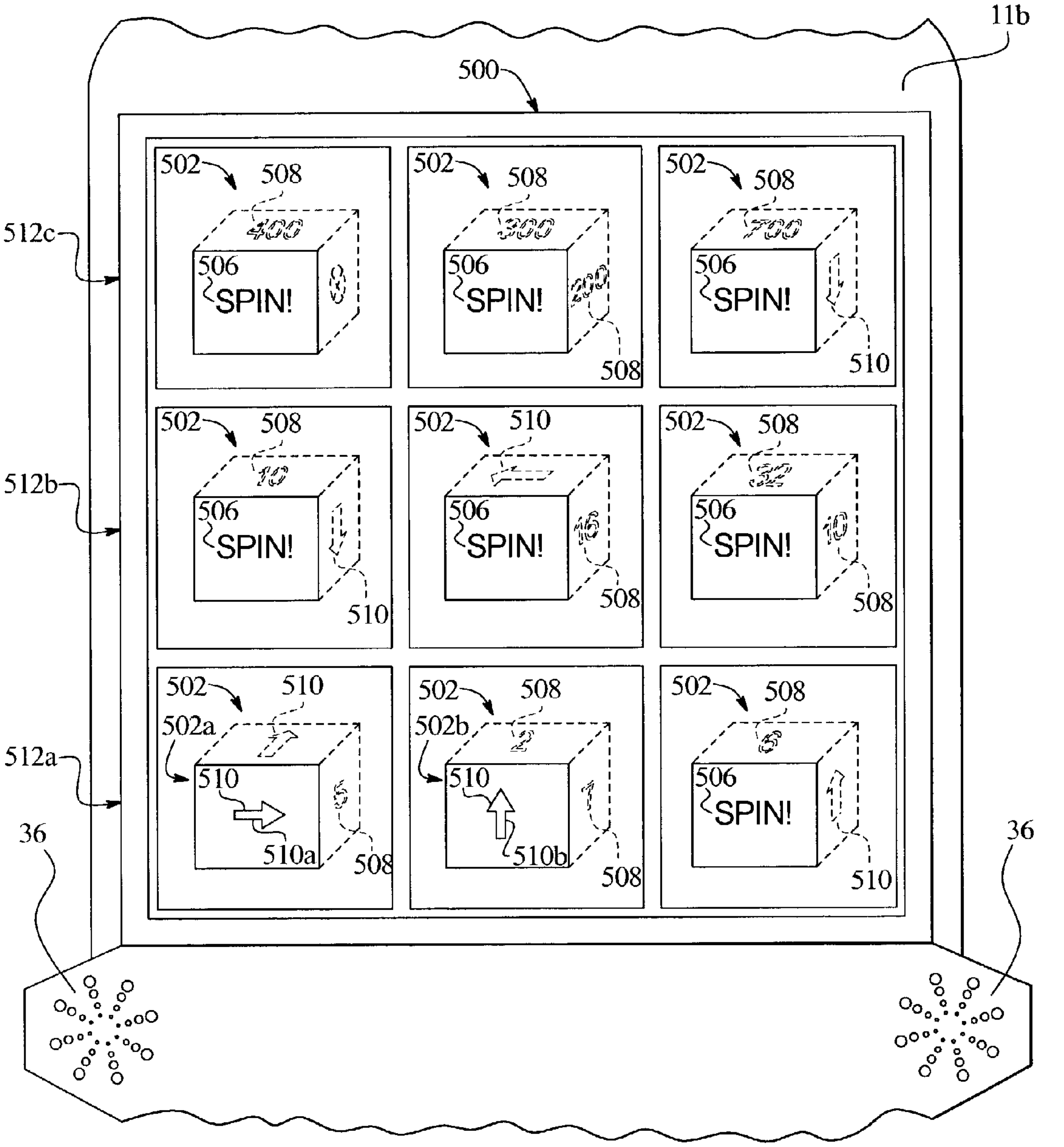
Figure 20C:
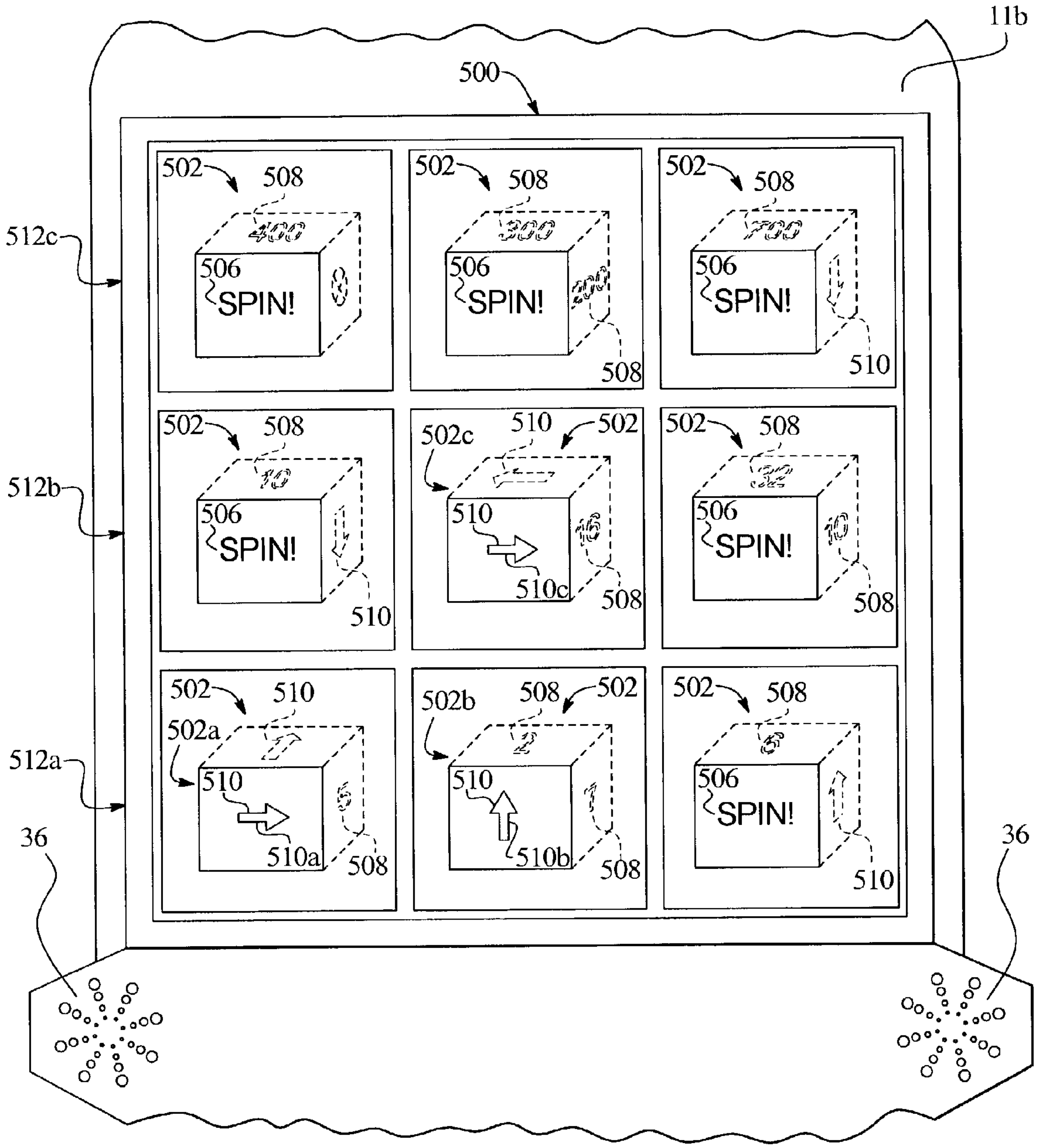
Figure 20D:
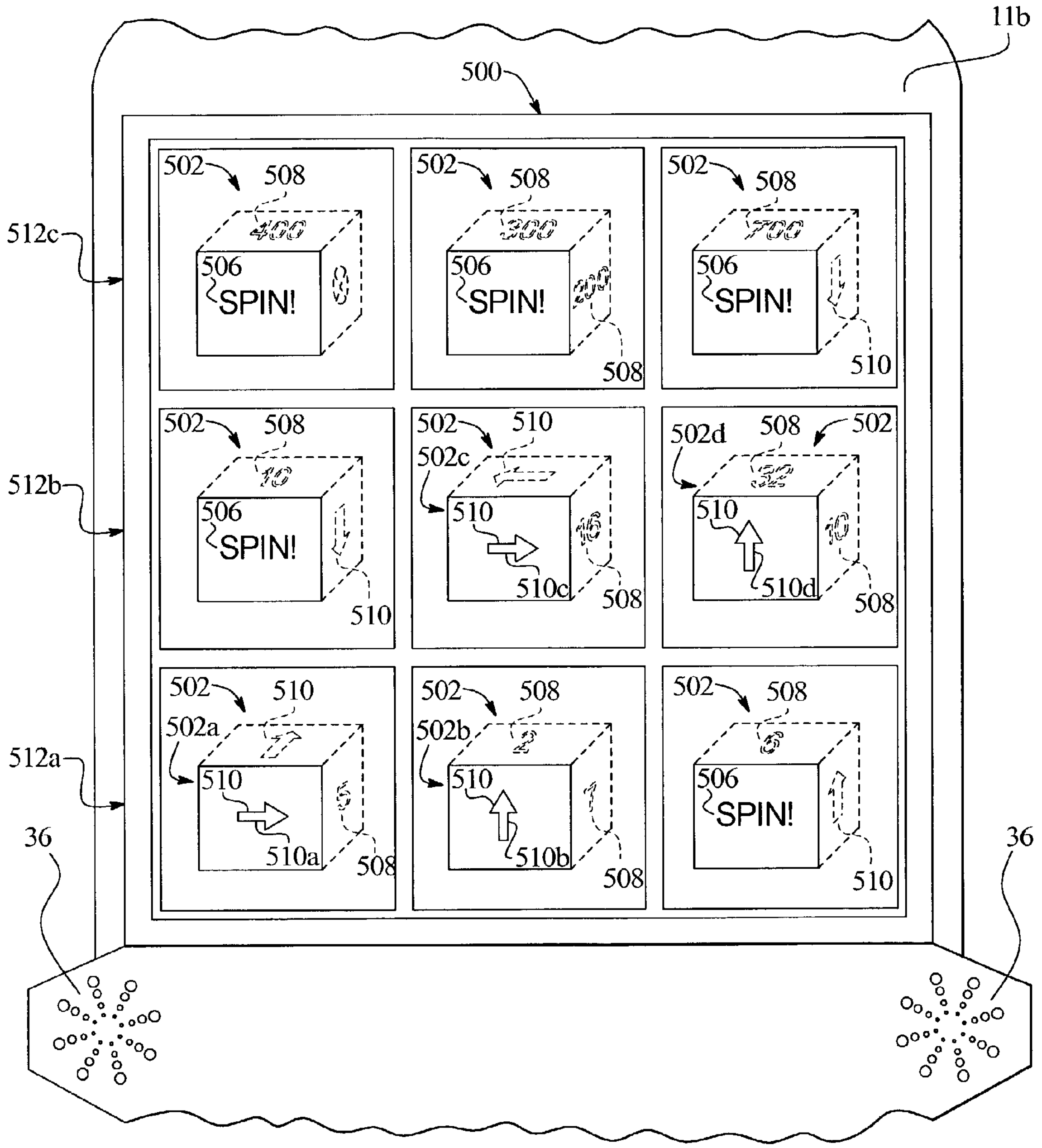
Figure 20E:
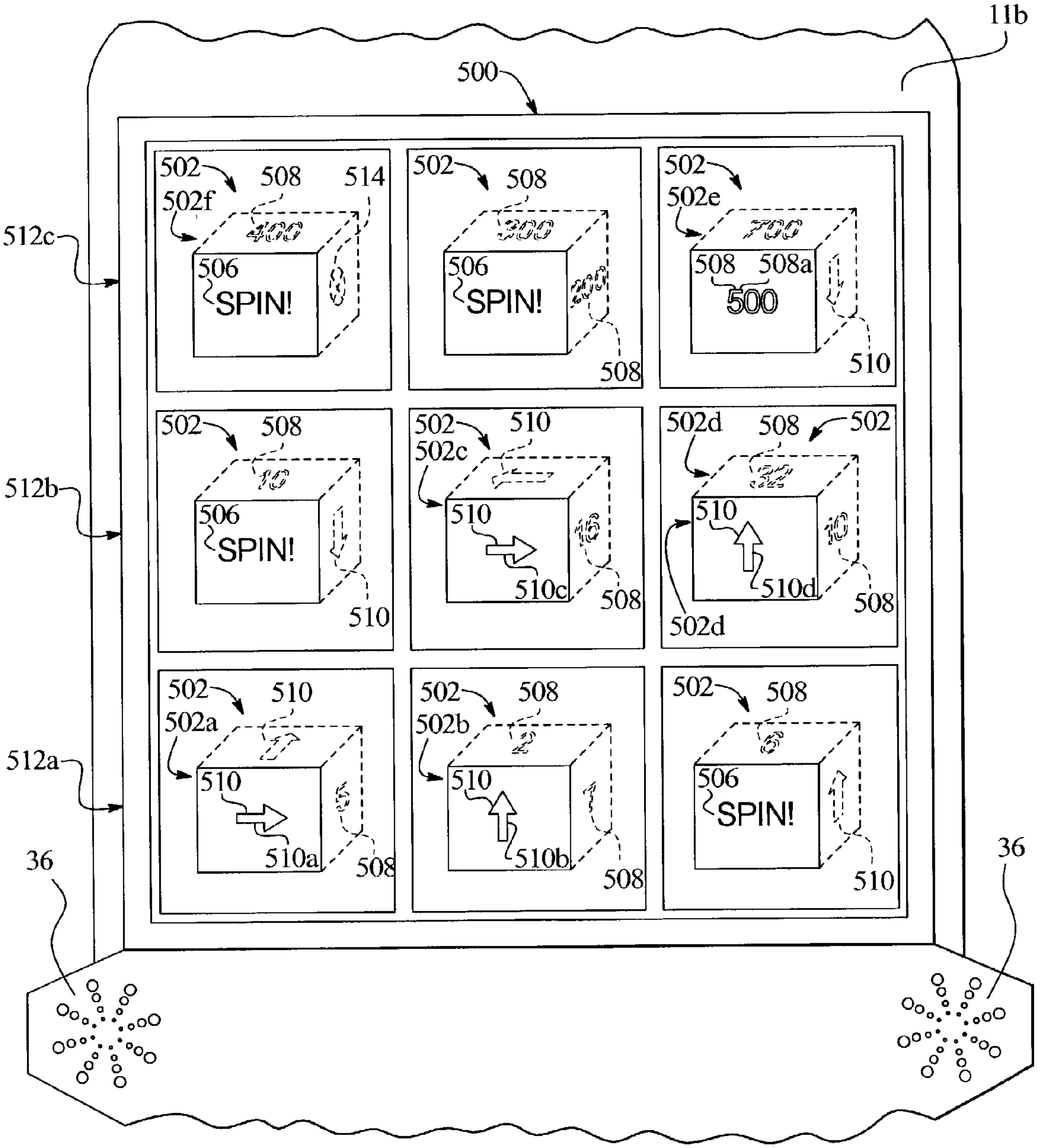

Referring to FIG. 20A, in this example, whether caused directly by the processor or by the player's input, die 502*a* rotates, stops and displays move indicator 510*a* to the player. Move indicator 510*a* includes an arrow which points to the right, indicating die 502*b*. As illustrated in FIG. 20B, die 502*b* then rotates and displays move indicator 510*b* to the player. Move indicator 510*b* includes an arrow which points upward, indicating die 502*c*. As illustrated in FIG. 20C, die 502*c* then rotates and displays move indicator 510*c*. Move indicator 510*c* includes an arrow which points to the right, indicating die 502*d*. As illustrated in FIG. 20D, die 502*d* then rotates and displays move indicator 510*d*. Move indicator 510*d* includes an arrow which points upward, indicating die 502*e*. As illustrated in FIG. 20E, die 502*e* rotates and displays award indicator 508*a*. Award indicator 508*a* is a numerical value of five hundred. The gaming device provides the player with an award of five hundred and then terminates the game.

It should be appreciated that the mechanical objects 502 can include various symbols associated with various predetermined events. For example, die 502*f* includes a terminating or termination symbol 514. If die 502*f* displays termination symbol 514 during the game, the game terminates. In another embodiment, the award indicators can function as terminators.

Dice Data

The die rotators of the gaming device of the present invention can include any suitable electrical and mechanical parts and devices which enable the gaming device to control the position of the mechanical dice. The gaming device indicates predetermined outcomes by stopping die rotation when predetermined visible faces are displayed to the player.

A predetermined outcome is associated with each face of each die. This information or dice data is stored in the data storage device. In the example illustrated in FIG. 11, a gaming device includes five mechanical dice. Each face of each die is labeled with a symbol which indicates an outcome to player. For instance, face one of die one is labeled with an award value of eighty credits, and face four of die two is labeled with a terminator symbol. The data storage device would store dice data (not shown) which enables the gaming device to provide the player with the predetermined outcomes indicated on the faces of the dice.

For example, in one embodiment the processor may use a random number generator to generate an outcome of fifty credits and three hundred credits. Using the dice data, the processor may cause: (a) die one to rotate and display face six; and (b) die two to rotate and display face five. The player would then view fifty credits on die six and three hundred credits on die two, the sum of which is three hundred fifty credits.

In another example, the processor may use a random number generator to generate an outcome of one hundred credits. Using the dice data, the processor may cause die one to rotate and display face two, and the processor may simultaneously cause die two to rotate and display face three. The player would then view forty credits on die one and sixty credits on die two, the sum of which is one hundred credits.

From these examples, it should be understood that the gaming device of the present invention can generate separate, discrete outcomes or award values for predetermined die and then use such dice to indicated these outcomes. It should also be understood that the gaming device can generate a total award value for no particular die or dice and then select a dice or dice to indicate the total award value.

Die Rotators

Figure 12:
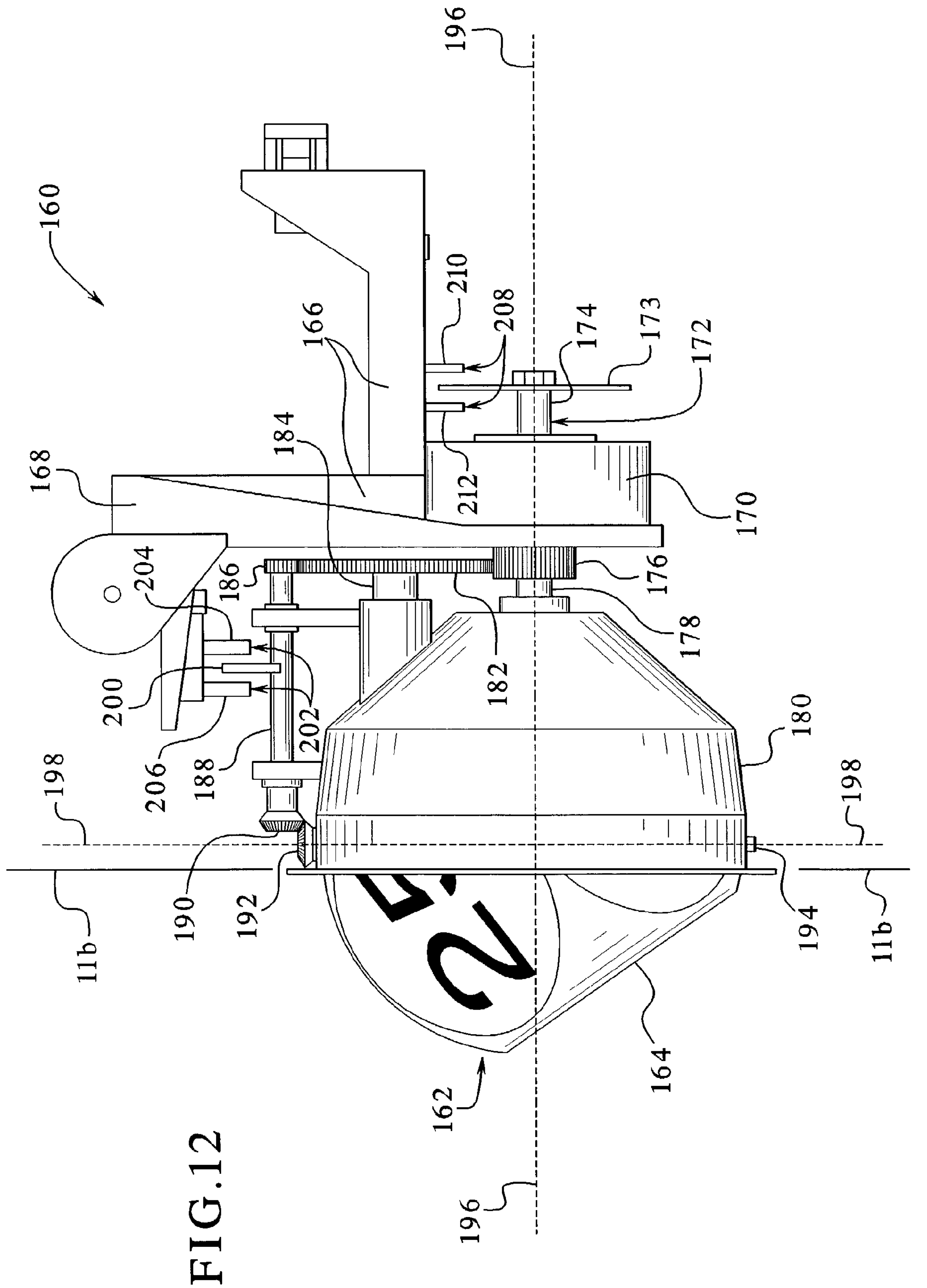
FIG. 12 is a side elevation view of one embodiment of the die rotator of the gaming device of the present invention.
Figure 13:
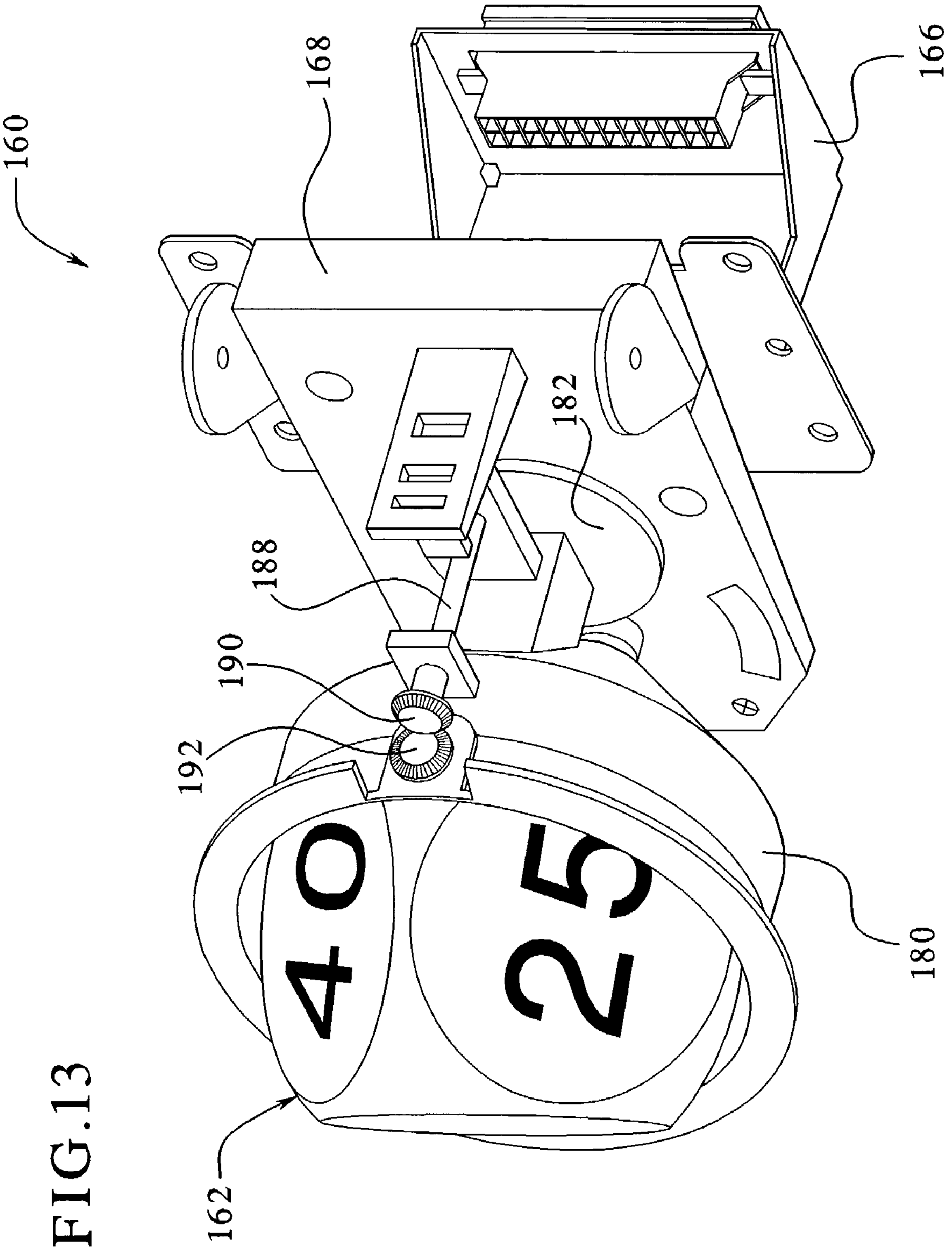
FIG. 13 is a bottom perspective view of the die rotator of FIG. 12.
Figure 14:
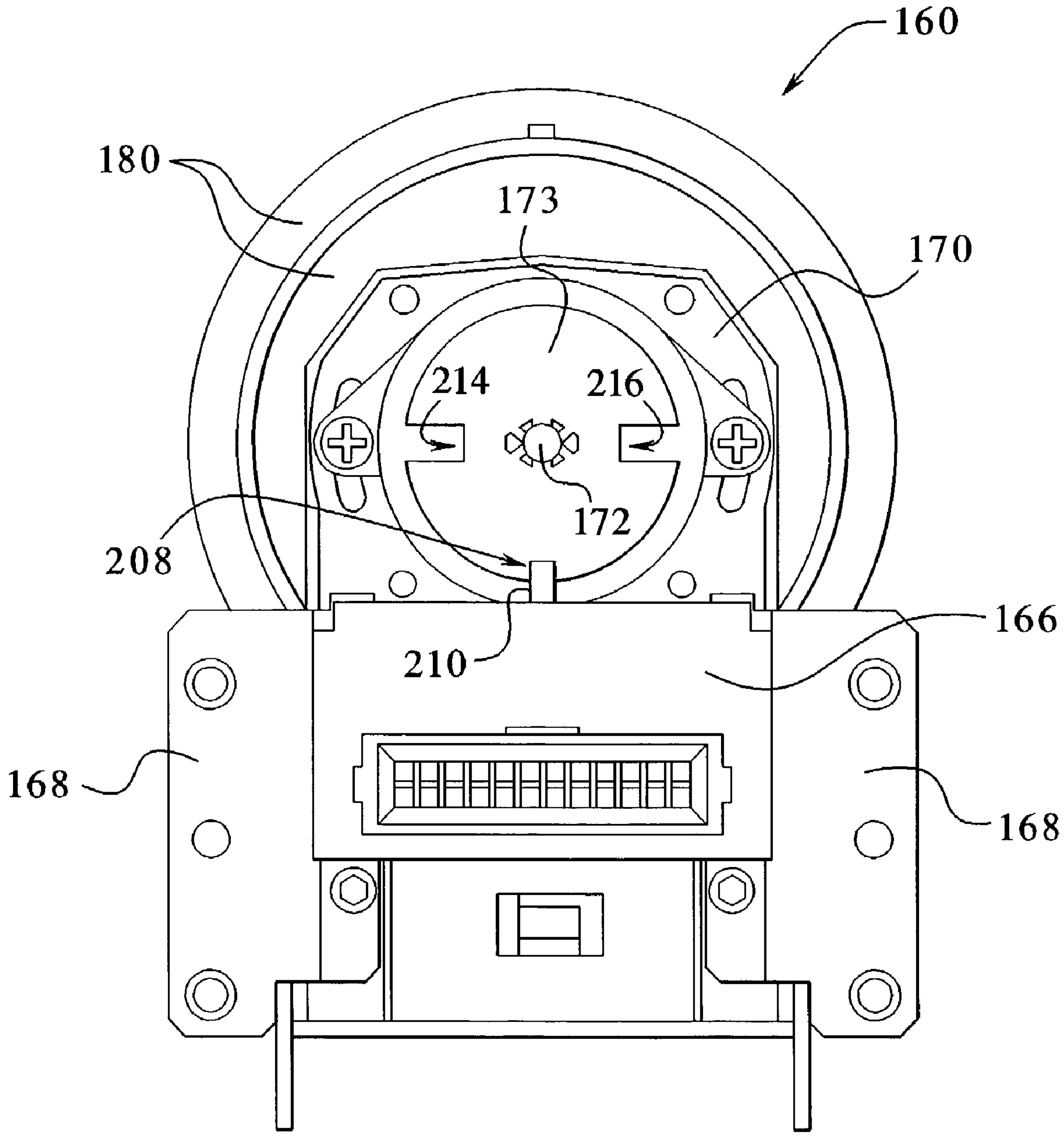
FIG. 14 is a rear elevation view of the die rotator of FIG. 12.

In one embodiment illustrated in FIGS. 12 to 14, die rotator 160 rotates a die 162 whose visible face 164 is oriented at a predetermined angle with respect to the cabinet surface 11*b*. Since the mechanical dice are mounted to the upper portion of the gaming device above the player's head, the visible face 164 points downward to provide the player with the full view of the visible face 164. Die rotator 160 includes: (a) a mount or mounting bracket 166 which is adapted to be attached to the interior of the gaming device cabinet; (b) a frame 168 connected to the mount or mounting bracket; (c) an actuator or motor 170 mounted on the frame; (d) a driveshaft 172 coupled to the motor 170 and extending from opposite sides of the rotator; (e) an optic encoder disk 173 secured and connected to the back end 174 of the driveshaft 172; (f) a fixed spur gear 176 rigidly connected to, and preferably integral with, the frame 168; (g) a die holder 180 rigidly connected to the front end 178 of the driveshaft 172; (h) a spur gear 182 mating with fixed spur gear 176; (i) a shaft 184 rotatably connected to die holder 180 and rigidly connected to spur gear 182; (j) a spur gear 186 mating with spur gear 182; (k) a shaft 188 rigidly connected to spur gear 186; (l) a bevel gear 190 rigidly connected to shaft 188; (m)

a bevel gear 192 mating with bevel gear 190; (n) a shaft (not shown) rigidly connected to bevel gear 192 and rigidly connected to die 162; and (o) a pin 194 which rotatably connects the die 162 to the die holder 180.

When the motor 170 operates, the drive shaft 172 spins, causing the rotation of optic encoder disk 173 and die holder 180. Die holder 180 rotates about an x-axis 196 defined by drive shaft 172. As the die holder 180 rotates, the gear set or gear assembly of the die rotator 160 cause the die 162 to rotate. Specifically, the front end of drive shaft 178 revolves around and engages fixed spur gear 176. This engagement causes spur gear 182 to rotate which, in turn, causes spur gear 186 to rotate. The rotation of spur gear 186 causes the rotation of shaft 188 and bevel gear 190. Bevel gear 190 engages bevel gear 192 which causes die 162 to rotate about a y-axis 198. The simultaneous rotation of die 162 about x-axis 196 and y-axis 198 causes the die 162 to rotate and eventually display all of its faces to the player.

In addition, shaft 188 is connected to a flag member 200. As shaft 188 rotates, so does flag member 200. A y-axis optical device 202 is connected to frame 168. Optical device or reader 202 includes a light emitting diode (LED) 204 spaced apart from a light sensor 206. In operation, LED 204 generates a light beam which is received by sensor 206. As shaft 188 rotates, flag member 200 periodically interrupts the light beam, generating light beam pulses. The gaming device processor reads the light beam pulses and converts them into machine-readable die control data or count data. This count data enables the processor to control and determine when each side of the die 162 has a visible position or is otherwise the visible face 164.

When the die rotator 160 is assembled, die 162 is mounted within die holder 180 so that face one of die 162 is the visible face 164 while flag member 200 is positioned between LED 204 and sensor 206. Accordingly, whenever flag member 200 blocks the light beam, a signal is produced which is associated with home data. The gaming device processor regularly checks for this home data to determine when face one of die 162 is the visible face or otherwise has a visible position.

The die rotator 160 further includes an x-axis optical device or reader 208 for tracking faces two through six of die 162. X-axis optical device or reader 208 is connected to mount 166. Optical device or reader 208 includes a light emitting diode (LED) 210 mounted on one side of the optic encoder disk 173 and a light sensor 212 mounted on the other side of the optic disk 173. As seen in FIG. 14, the optic encoder disk 173 includes at least two slots 214 and 216. Slot 214 is located one hundred and eighty degrees apart from slot 216. In operation, the LED 210 generates a light beam which is blocked by optic encoder disk 173. When the optic encoder disk 173 rotates, slots 214 and 216 alternately align with the path of the light beam which causes the sensor 212 to receive the light beam in pulses. The gaming device processor reads the pulses and converts them into machine-readable die control data.

When die rotator 160 is assembled, the encoder disk 173 is adjusted so that slot 214 or 216 is aligned between LED 210 and sensor 212 when a full face of die 162 is the visible face 164. Accordingly, whenever a slot 214 or 216 enables the light beam to reach sensor 212, the gaming device processor is notified that a face is a visible face at that point in time.

By using the flag signal from optical device 202, the gaming device processor tracks whenever face one is a visible face 164. As such, optical device 202 or reader functions as a home sensor which notifies the gaming device processor when the die 162 is at a home position. By using the pulses from optical device or reader 208, the processor counts die faces two through six as they become visible faces.

For example, when the die 162 begins rotating, the flag member 200 may be between LED 204 and sensor 206 in which case the gaming device processor is notified that face one is the visible face. As the die rotates, the gaming device processor counts how many times a slot 214 or 216 passes between LED 210 and sensor 212. The total count is added to face one, resulting in face two, face three, face four, face five or face six reading. Each time flag member 200 passes between LED 204 and sensor 206, the gaming device processor resets this count to zero. If the die rotator begins rotating when a face other than face one is the visible face, the die rotator rotates the die a long enough time so that the flag member 200 passes between LED 204 and sensor 206 at least once. From that point forward, the gaming device processor can track and control whether the visible face is face one, face two, face three, face four, face five or face six.

It should be understood that optical device or reader 208 in conjunction with encoder disk 173 enable the die rotator to notify the gaming device processor of the die's visible face without relying upon calculations involving the type or speed of motor 170. Because the die holder 180 and encoder disk 173 are directly and rigidly connected to the motor shaft 172, the encoder disk 173 translates the operation of the motor (whether proper or improper) into accurate information about the position of the die 162. The die movement is thus directly and mechanically linked to the movement of the encoder disk. Therefore, the skipping of gears, variation in motor speed or motor malfunction will have less of an impact on producing erroneous die position information.

Though the die rotator of the present invention preferably includes an x-axis optical device and a y-axis optical device, it should be appreciated that the die rotator can include any suitable electromechanical motion detector, position tracking device or assembly, sensing device or sensing devices which, by communication with the gaming device processor, enables the gaming device processor to track and control which die face is a visible face at any one point in time. For example, the die rotator can include two optical devices or readers which co-act with rotating members coupled to the motor shaft. One of such members may be similar in construction to encoder disk 173 of die rotator 160. The other member is preferably engaged by one or more gears in order to cause a flag member or slot to align with the optical device only when a face one or home face of the die is the visible face. The gear ratio for such gearing preferably corresponds to the gear ratio of the gearing which translates the shaft motor rotation to rotation of the die about the y-axis.

It should also be appreciated that, instead of including flag member 200 and encoder disk 173, the present invention can include any suitable alternate members of any suitable shape or size. For example, an encoder disk with a single slot could be used instead of flag member 200. Also, a single blade could be use instead of encoder disk 173. In addition, an encoder disk with three slots or six slots could be used instead of encoder disk 173. Furthermore, the encoder disk can include slots or openings of any suitable size or shape.

Figure 15:
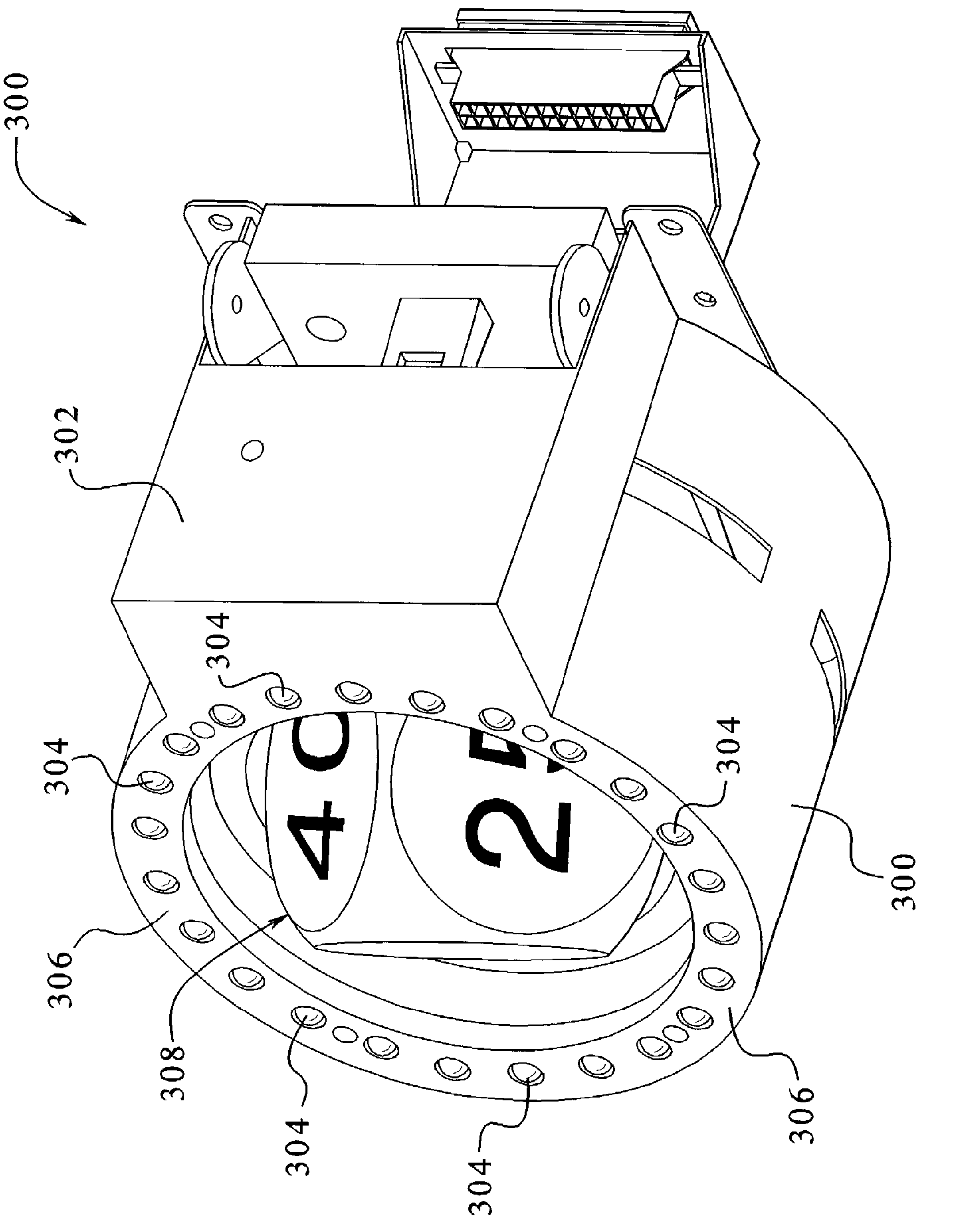
FIG. 15 is a top perspective view of the die rotator illustrating the die rotator's container of one embodiment of the present invention.
Figure 16:
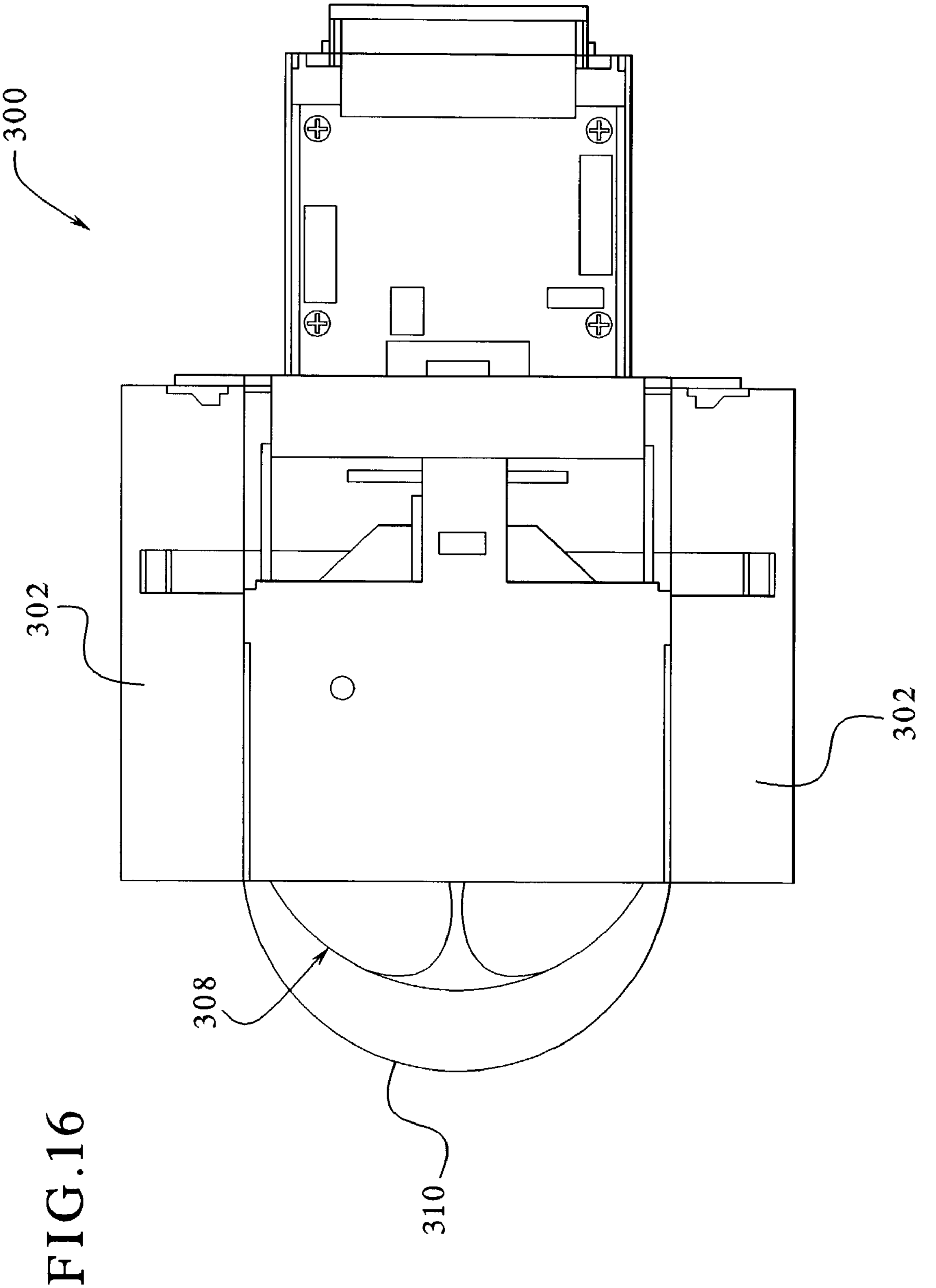
FIG. 16 is a top plan view of the die rotator illustrating the die rotator's container and cover of one embodiment of the present invention.

As illustrated in FIGS. 15 and 16, in one embodiment, die rotator 300 includes a container 302 which encases the die holder and generally covers the various gears, shafts and internal parts of the die rotator. Preferably, container 302 is constructed of sheet metal. Die rotator 300 also includes a plurality of light sources, electrical lights or lamps 304 which are connected to the visible end 306 of the container 302. The light sources or lamps 304 preferably have predetermined colors. Lamps 304, when powered, illuminate the die 308 as well as the area surrounding the die 308.

Die rotator 300 also includes a die rotator processor (not shown) which communicates with a die rotator memory device (not shown). The die rotator memory device stores one or more predetermined programs which direct the die rotator processor to control the illumination of the light sources or lamps 304. Preferably, the die rotator processor causes the lamps 304 to exhibit predetermined lighting displays, patterns and effects when predetermined events occur during the operation of the gaming device. For example when a die rotates, the die rotator processor preferably illuminates the lamps 304 surrounding that die.

As illustrated in FIG. 16, die rotator 300 also includes a transparent or translucent cover 310 which covers die 308. Cover 310 preferably has a spherical or dome shape and is preferably constructed of plastic. However, it should be appreciated that cover 310 can have any suitable shape and can be constructed of any suitable material.

Figure 17:
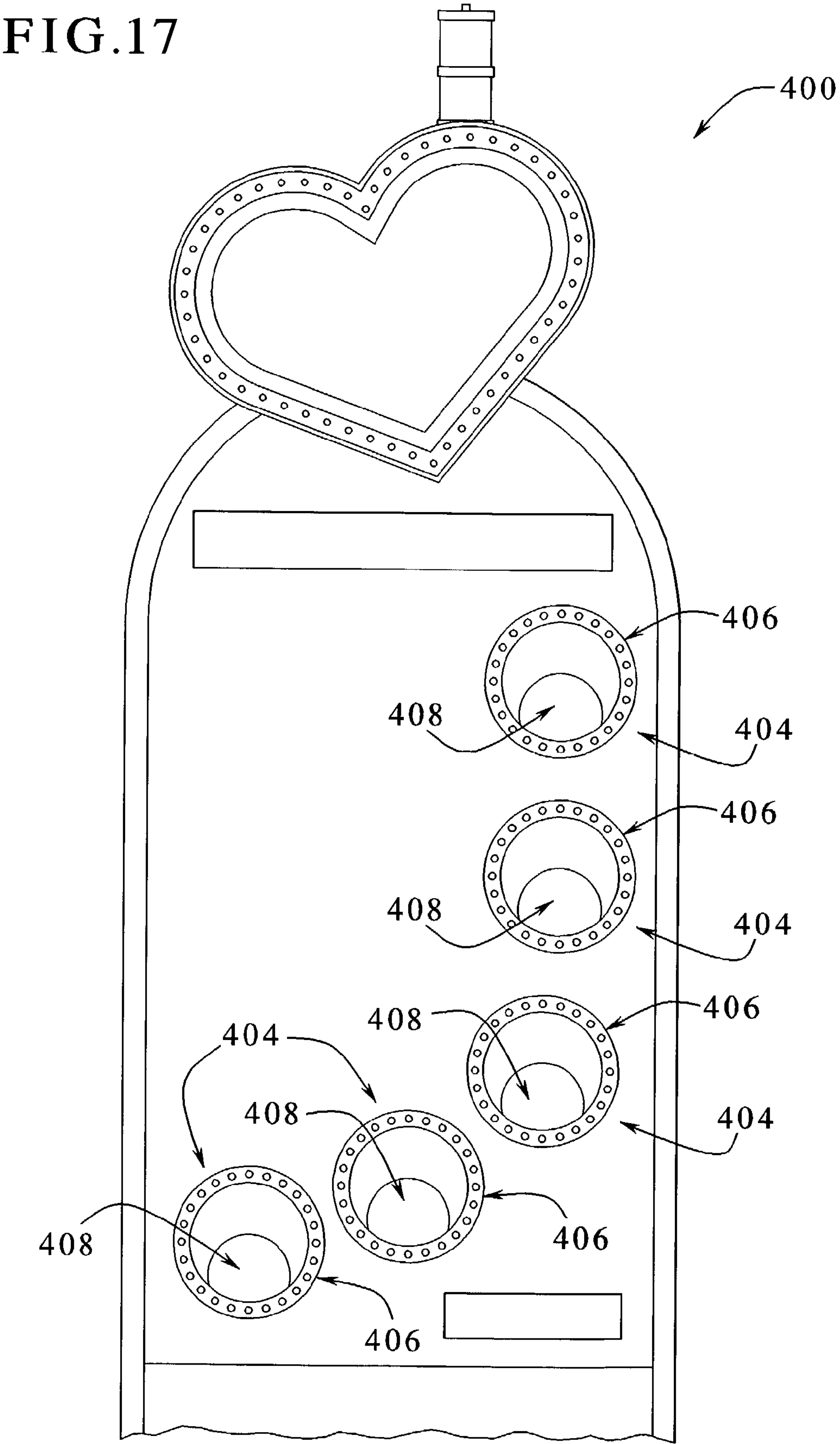
FIG. 17 is a front plan view of the gaming device illustrating the lamp sets in one embodiment of the present invention.
Figure 18:
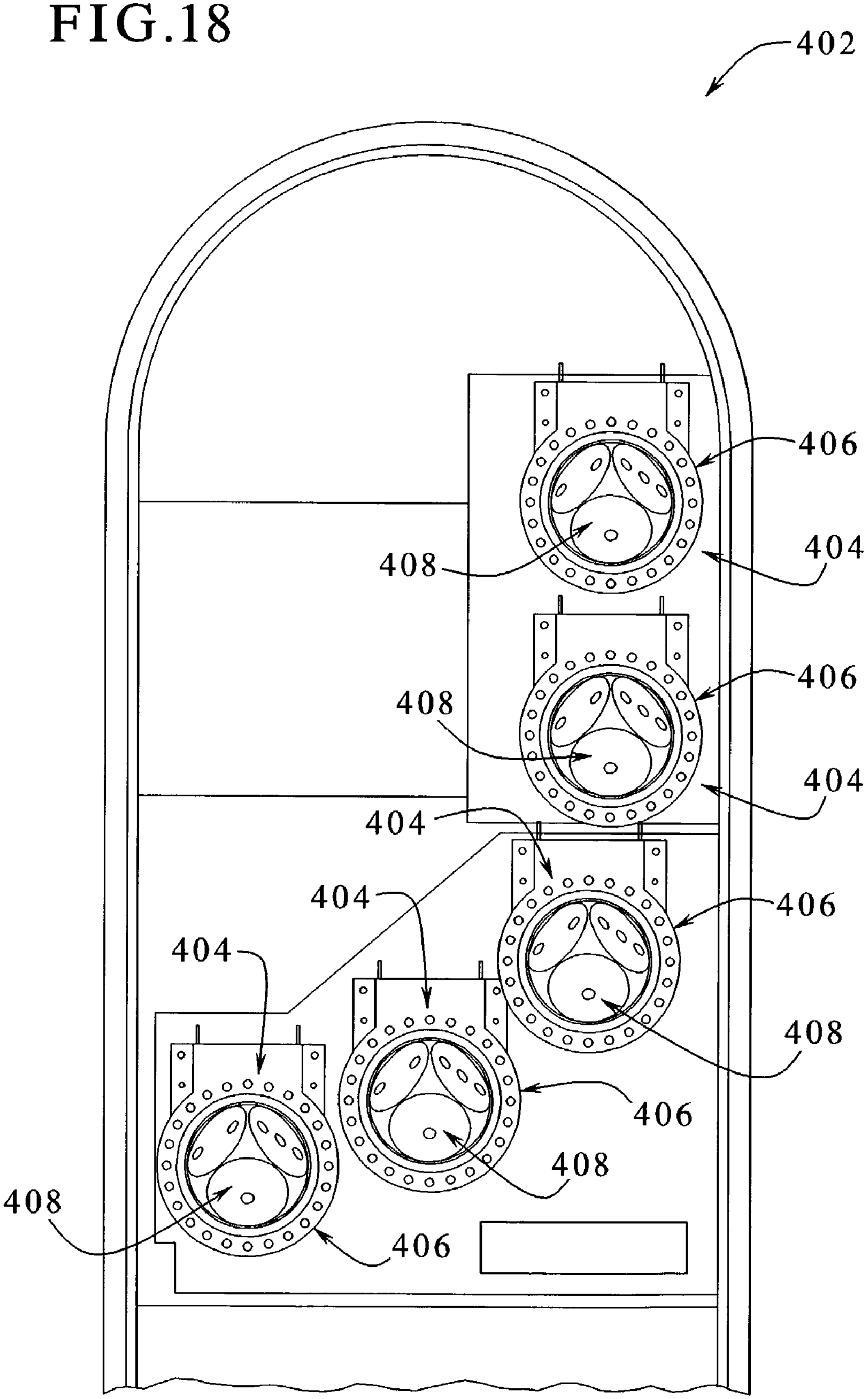
FIG. 18 is a front plan view of the gaming device illustrating the lamp sets in another embodiment of the present invention.
Figure 19A:
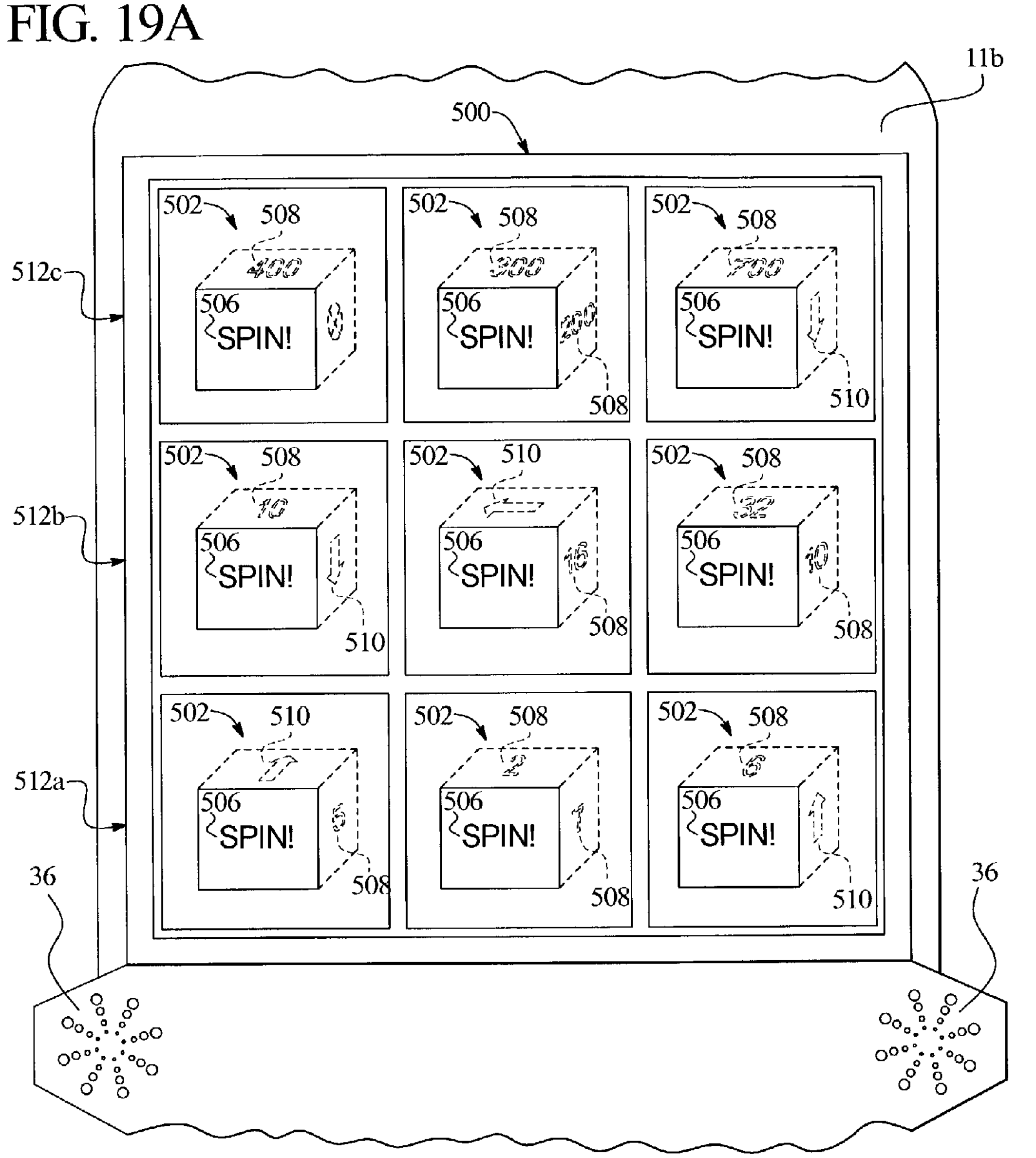
FIGS. 19A and 19B are perspective views of one embodiment of the present invention.
Figure 19B:
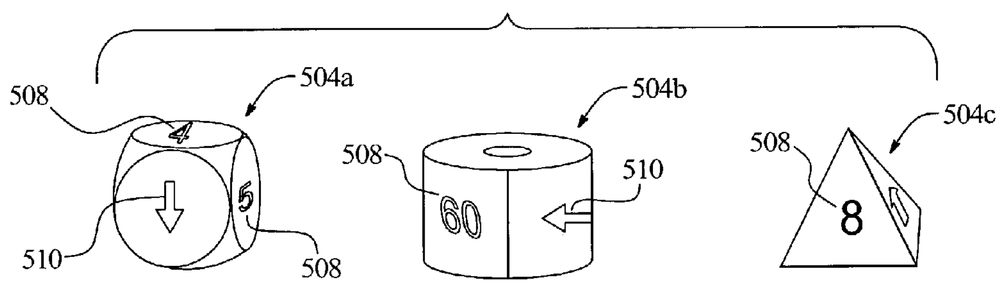

As illustrated in FIGS. 17 and 18, in one embodiment gaming device toppers 400 and 402 include a plurality of die rotators 404 and lamp sets 406. The term "topper" includes the upper portion of a gaming device. Each lamp set 406 surrounds each die rotator 404. Each die rotator 404 holds and rotates a die 408. When the die rotates in a sequence, the lamp sets generate a predetermined illumination display which illuminates the dice 408 and the area surrounding the dice 408.

In should also be appreciated that although the award indicator of the present invention preferably rotates mechanical dice, the award indicator can rotate other objects, such as wheels, balls or other suitable objects. For example, such objects can include multi-sided objects having more than six sides or less than six sides. These objects and the dice used in the present invention can include or incorporate structural modifications to or variations of the conventional dice. Such variations can include rounded edges, concave faces, convex faces and other structural changes.

The gaming device of the present invention includes an award indicator which enables the gaming device to rotate mechanical dice which bear award values. The gaming device uses the award indicator to provide predetermined award values to players. This type of gaming device increases the excitement and pleasure experienced by gaming device players.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a cabinet;

at least one actuator supported by the cabinet;

a drive shaft coupled to the actuator;

at least one support member operatively coupled to the drive shaft;

a gear set operatively coupled to the drive shaft;

a shaft connected to the gear set;

a plurality of position tracking devices, wherein at least one of said position tracking devices includes at least one movable member directly secured to the drive shaft, at least one of said position tracking devices includes at least one movable member secured to the shaft connected to the gear set and each of said position tracking devices is positioned in a different axis;

a multi-sided object rotatably connected to the support member, the multi-sided object having a plurality of different axes of rotation which said object is rotatable about and at least one symbol.

2. The gaming device of claim 1, wherein at least one of the movable members includes a light beam interrupter.

3. The gaming device of claim 1, wherein at least one of the movable members includes an optic encoder member.

4. The gaming device of claim 1, wherein at least one of the position tracking devices includes an optical sensor supported by the cabinet adjacent to the movable member.

5. The gaming device of claim 4, wherein the optical sensor includes a light source and a light sensor.

6. The gaming device of claim 5, wherein the light source is operable to generate a plurality of light beam pulses which are received by the light sensor.

7. The gaming device of claim 6, which includes at least one processor in communication with the actuator and at least one memory device in communication with the processor.

8. The gaming device of claim 7, wherein the memory device stores data associated with the light beam pulses.

9. The gaming device of claim 8, wherein the data has a machine readable format.

10. The gaming device of claim 1, which includes a plurality of light sources mounted to the cabinet adjacent to the multi-sided object.

11. The gaming device of claim 1, wherein the multi-sided object is a mechanical die.

12. The gaming device of claim 11, which includes a die cover mounted to the cabinet over the mechanical die.

13. The gaming device of claim 1, wherein the symbol includes an award symbol.

14. The gaming device of claim 13, wherein the symbol includes a numeral.

15. A gaming device comprising:

a cabinet;

a motor;

a first shaft coupled to the motor;

a gear set operatively coupled to the first shaft;

a second shaft connected to the gear set;

an object rotator supported by the cabinet, the object rotator including a plurality of position tracking devices, wherein each of said position tracking devices includes at least one moveable member secured to one of the shafts and each of said position tracking devices is positioned in a different axis; and a multi-sided object rotatably connected to the object rotator, the multi-sided object having a plurality of different axes of rotation which said object is rotatable about and at least one symbol.

16. The gaming device of claim 15, wherein at least one of the position tracking devices is directly secured to the drive shaft.

17. The gaming device of claim 15, wherein at least one of the position tracking devices includes an optical sensor and a light beam interrupter.

18. The gaming device of claim 17, wherein the light beam interrupter is secured to the drive shaft.

19. The gaming device of claim 18, wherein the light beam interrupter includes an optic encoder member.

20. The gaming device of claim 15, wherein a first one of the position tracking devices includes a first light source, a first light sensor and a first light beam interrupter having a position associated with a home position of the multi-sided object.

21. The gaming device of claim 20, wherein a second one of the object position tracking device includes a second light source, a second light sensor and a second light beam interrupter.

22. The gaming device of claim 21, which includes a plurality of light beam pulses received by the second light sensor, the light beam pulses convertible to position data, the position data associated with a plurality of positions of the multi-sided object.

23. The gaming device of claim 22, which includes at least one processor in communication with the motor and at least one memory device in communication with the processor.

24. The gaming device of claim 23, wherein the memory device stores the position data.

25. The gaming device of claim 24, wherein the position data has a machine readable format.

26. The gaming device of claim 15, which includes a plurality of light sources mounted to the cabinet adjacent to the multi-sided object.

27. The gaming device of claim 15, wherein the multi-sided object is a mechanical die.

28. The gaming device of claim 27, which includes a die cover mounted to the cabinet over the mechanical die.

29. The gaming device of claim 15, wherein the symbol includes an award symbol.

30. The gaming device of claim 29, wherein the symbol includes a numeral.

31. A gaming device comprising:

a cabinet;

at least one object rotator connected to the cabinet, the object rotator including means for rotating a multi-sided object about a plurality of axes, a motor operatively coupled to the rotating means and a plurality of position tracking devices operatively coupled to the motor, wherein each of the position tracking devices is positioned in different axes and includes at least one movable member coupled to the rotating means, at least one of the position tracking devices producing a plurality of light beam pulses as the multi-sided object rotates, wherein the multi-sided object is rotatably connected to the object rotator and rotatable about a plurality of different axes; and at least one processor, in communication with the motor, which produces a machine-readable code based on the light beam pulses in order to determine when each side of the object has a predetermined position.

32. The gaming device of claim 31, wherein at least one of the position tracking devices includes an optical encoder member.

33. The gaming device of claim 32, wherein at least one of the position tracking devices includes a plurality of light beam interrupters.

34. The gaming device of claim 33, wherein at least one of the position tracking devices includes a plurality of optical sensors.

35. The gaming device of claim 34, wherein the object rotator includes a drive shaft coupled to the motor.

36. The gaming device of claim 35, wherein at least one of the light beam interrupters is coupled to the drive shaft.

37. The gaming device of claim 35, wherein at least one of the light beam interrupters is secured to the drive shaft.

38. A gaming device comprising:

a cabinet;

a display device connected to the cabinet;

a processor in communication with the display device;

at least one support member connected to the cabinet, the support member adapted to support an object having a first side and a plurality of other sides, each of the sides having a visible position;

means coupled to the object for rotating the object about a plurality of different axes;

a motor coupled to said rotating means;

a drive shaft coupled to the motor;

a gear set operatively coupled to the drive shaft;

a first position sensing device positioned along a first of said axes, said first position sensing device coupled to the gear set and including at least one movable member connected to the gear set, wherein said first position sensing device produces home data when the first side of the object has the visible position;

a second position sensing device positioned along a second of said axes, said second position sensing device connected to the drive shaft and including at least one movable member connected to the drive shaft, wherein said second position sensing device produces count data as each of the other sides of the object moves through a visible position; and a processor in communication with the first position sensing device, the second position sensing device and the motor, which processes the home data and the count data to control the rotating means.

39. The gaming device of claim 38, wherein the first position sensing device includes an optical device supported by the cabinet and a light beam interrupter coupled to the gear set.

40. The gaming device of claim 39, wherein the second position sensing device includes an optical device supported by the cabinet and a light beam interrupter connected to the drive shaft.

41. The gaming device of claim 40, wherein the light beam interrupter of the second sensing device includes an optical encoder member.

42. The gaming device of claim 41, wherein the object includes a mechanical die.

43. The gaming device of claim 42, wherein the mechanical die includes an award in numeric form.

44. An object rotator for a gaming device having a cabinet, the object rotator comprising:

at least one support member connectable to the cabinet, the support member adapted to support the object in rotation about a plurality of different axes, the object having a first side and a plurality of other sides, each of the sides having a visible position;

a motor coupled to the support member;

a drive shaft coupled to the motor;

a gear set operatively coupled to the drive shaft;

a first sensing device positioned along a first of said axes, said first sensing device coupled to the gear set and including at least one movable member connected to the gear set, wherein said first sensing device produces home data when the first side of the object has the visible position; and a second sensing device positioned along a second of said axes, said second sensing device connected to the drive shaft and including at least one movable member connected to the drive shaft, wherein said second sensing device produces count data as each of the other sides of the object moves through a visible position.

45. The object rotator of claim 44, wherein the first sensing device includes a first optical device connectable to the cabinet and a first light beam interrupter coupled to the gear set.

46. The object rotator of claim 45, wherein the second sensing device includes a second optical device connectable to the cabinet and a second light beam interrupter connected to the drive shaft.

47. The object rotator of claim 46, wherein the second light beam interrupter includes an optical encoder member.

48. The object rotator of claim 44, wherein the object includes a mechanical die.

49. The object rotator of claim 48, wherein the mechanical die includes a numerical award symbol.

* * * * *

UNITED STATES PATENT AND TRADEMARK OFFICE

CERTIFICATE OF CORRECTION

PATENT NO. : 7,204,754 B2
APPLICATION NO. : 10/256618
DATED : April 17, 2007
INVENTOR(S) : James M. Gray et al.

It is certified that error appears in the above-identified patent and that said Letters Patent is hereby corrected as shown below:

On the title page: item [56]

In U.S. Patent Documents change “5,788,573A  8/1998” to --5,788,573A 3/1996--.

Signed and Sealed this

Eleventh Day of December, 2007

JON W. DUDAS
*Director of the United States Patent and Trademark Office*